US011926145B2

(12) United States Patent
Egerton et al.

(10) Patent No.: US 11,926,145 B2
(45) Date of Patent: Mar. 12, 2024

(54) CAN BODY DECORATOR HAVING A MANDREL PRE-SPIN ASSEMBLY AND OVER-VARNISH UNIT

(71) Applicant: Crown Packaging Technology, Inc., Alsip, IL (US)

(72) Inventors: Daniel Egerton, North Yorkshire (GB); Michael Jonathan Coates, West Yorkshire (GB); Daren Blake, Manchester (GB); Michael Halstead, Manchester (GB); Damien Bailey, Wantage (GB)

(73) Assignee: Crown Packaging Technology, Inc., Alsip, IL (US)

( * ) Notice: Subject to any disclaimer, the term of this patent is extended or adjusted under 35 U.S.C. 154(b) by 0 days.

(21) Appl. No.: 17/540,433

(22) Filed: Dec. 2, 2021

(65) Prior Publication Data

US 2022/0088918 A1 Mar. 24, 2022

Related U.S. Application Data

(62) Division of application No. 16/670,623, filed on Oct. 31, 2019, now Pat. No. 11,446,921.

(Continued)

(51) Int. Cl.

*B41F 17/22* (2006.01)
*B41F 13/008* (2006.01)

(Continued)

(52) U.S. Cl.

CPC .......... *B41F 31/002* (2013.01); *B41F 13/008* (2013.01); *B41F 13/14* (2013.01); *B41F 17/002* (2013.01); *B41F 17/22* (2013.01); *B41F 31/13* (2013.01); *B41F 13/0008* (2013.01); *B41F 13/025* (2013.01); *B41F 31/004* (2013.01); *B41P 2213/202* (2013.01);

(Continued)

(58) Field of Classification Search

None

See application file for complete search history.

(56) References Cited

U.S. PATENT DOCUMENTS 3,766,851 A 10/1973 Sirvet et al.
3,956,986 A 5/1976 Wirz et al.

(Continued)

FOREIGN PATENT DOCUMENTS

CH 654524 A5 2/1986
CN 1832857 A 9/2006

(Continued)

OTHER PUBLICATIONS

"International Preliminary Report on Patentability received for PCT Patent Application No. PCT/US2019/059262, dated May 14, 2021", 13 pages.

(Continued)

*Primary Examiner* — Leslie J Evanisko
(74) *Attorney, Agent, or Firm* — Condo Roccia Koptiw LLP

(57) ABSTRACT

An over-varnish unit and mandrel pre-spin system for a can decorator, especially for beverage can bodies, can have a mandrel pre-spin belt that is outside of the over-varnish unit housing. The position of the can infeed on the mandrel wheel and the print point is controlled.

9 Claims, 26 Drawing Sheets

Related U.S. Application Data

(60) Provisional application No. 62/753,818, filed on Oct. 31, 2018.

(51) Int. Cl.

| | |
|---|---|
| ***B41F 13/14*** | (2006.01) |
| ***B41F 17/00*** | (2006.01) |
| ***B41F 31/00*** | (2006.01) |
| ***B41F 31/13*** | (2006.01) |
| *B41F 13/00* | (2006.01) |
| *B41F 13/02* | (2006.01) |

(52) U.S. Cl.

CPC ..... *B41P 2213/734* (2013.01); *B41P 2227/11* (2013.01); *B41P 2227/21* (2013.01)

(56) References Cited

U.S. PATENT DOCUMENTS

| | | | | | |
|---|---|---|---|---|---|
| 3,996,851 | A * | 12/1976 | Urban | B41F 17/22 101/247 |
| 4,140,053 | A | 2/1979 | Skrypek et al. | |
| 4,441,418 | A * | 4/1984 | Hahn | B05C 1/022 101/38.1 |
| 4,741,266 | A | 5/1988 | Stirbis et al. | |
| 4,773,326 | A | 9/1988 | Hudec | |
| 4,921,093 | A | 5/1990 | Peters et al. | |
| 5,122,097 | A * | 6/1992 | Chasteen | B41F 17/22 474/84 |
| 5,130,653 | A | 7/1992 | Wu et al. | |
| 5,235,911 | A | 8/1993 | Dorfman et al. | |
| 5,337,659 | A | 8/1994 | Whelan | |
| 5,720,221 | A | 2/1998 | Harig et al. | |
| 6,766,743 | B2 | 7/2004 | Hayashi et al. | |
| 7,171,900 | B2 | 2/2007 | Niemiro | |
| 7,347,899 | B2 | 3/2008 | Day | |
| 8,327,762 | B2 | 12/2012 | Masuch et al. | |
| 9,862,204 | B2 | 1/2018 | Izume | |
| 10,131,138 | B2 | 11/2018 | Bonner | |
| 2012/0037017 | A1 | 2/2012 | Masuch et al. | |
| 2012/0216689 | A1 | 8/2012 | Cochran et al. | |
| 2012/0272846 | A1 | 11/2012 | Fleischer et al. | |
| 2013/0087059 | A1 | 4/2013 | Baird et al. | |
| 2013/0098256 | A1 | 4/2013 | Bonner | |
| 2013/0174753 | A1 | 7/2013 | Jeter et al. | |
| 2014/0373741 | A1 | 12/2014 | Wilkinson | |
| 2015/0336750 | A1 | 11/2015 | Coates et al. | |
| 2016/0229198 | A1 | 8/2016 | Izume | |
| 2018/0009216 | A1 * | 1/2018 | Egerton | B41F 33/0036 |

FOREIGN PATENT DOCUMENTS

| | | | |
|---|---|---|---|
| CN | 103180130 | A | 6/2013 |
| CN | 103492183 | A | 1/2014 |
| CN | 104220260 | A | 12/2014 |
| CN | 104903107 | A | 9/2015 |
| CN | 105764692 | A | 7/2016 |
| DE | 2835129 | A1 | 2/1979 |
| DE | 4228128 | A1 | 3/1994 |
| EP | 0263422 | A2 | 4/1988 |
| EP | 1162064 | A2 | 12/2001 |
| EP | 1262321 | A2 | 12/2002 |
| EP | 2701912 | A1 | 3/2014 |
| EP | 3050705 | A1 | 8/2016 |
| EP | 3490736 | A1 | 6/2019 |
| GB | 2141063 | A | 12/1984 |
| GB | 2271072 | A | 4/1994 |
| GB | 2561859 | A | 10/2018 |
| JP | S54-8011 | A | 1/1979 |
| JP | S58-49256 | A | 3/1983 |
| JP | S63-139746 | A | 6/1988 |
| JP | H06-91855 | B2 | 11/1994 |
| JP | 2001-138484 | A | 5/2001 |
| JP | 2002-240236 | A | 8/2002 |
| JP | 2003-072031 | A | 3/2003 |
| JP | 48-58905 | B2 | 1/2012 |
| JP | 2013-544675 | A | 12/2013 |
| JP | 2015-063022 | A | 4/2015 |
| WO | 01/12440 | A1 | 2/2001 |
| WO | 2008/092940 | A2 | 8/2008 |
| WO | 2012/054655 | A1 | 4/2012 |

OTHER PUBLICATIONS

"International Preliminary Report on Patentability received for PCT Patent Application No. PCT/US2019/059263, dated May 14, 2021", 16 pages.

"International Preliminary Report on Patentability received for PCT Patent Application No. PCT/US2019/059265, dated May 14, 2021", 11 pages.

"International Search Report and Written Opinion received for PCT Patent Application No. PCT/US2019/059262, dated Jun. 24, 2020", 18 pages.

"International Search Report and Written Opinion received for PCT Patent Application No. PCT/US2019/059263, dated Jun. 24, 2020", 21 pages.

* cited by examiner

230

CAN BODY DECORATOR HAVING A MANDREL PRE-SPIN ASSEMBLY AND OVER-VARNISH UNIT

CROSS-REFERENCE TO RELATED APPLICATION

This application is a divisional of U.S. application Ser. No. 16,670,623, filed on Oct. 31, 2019, which claims priority to U.S. Patent Application Ser. No. 62/753,818, filed Oct. 31, 2018, the disclosures of which are hereby incorporated by reference in their entirety herein. This application is related by subject matter to U.S. application Ser. No. 16/670,689, filed Oct. 31, 2019 and to U.S. application Ser. No. 16/670,750, filed Oct. 31, 2019, which claim priority to U.S. Patent Application Ser. No. 62/753,818, filed Oct. 31, 2018, the disclosures of which are incorporated by reference in their entirety herein.

BACKGROUND

The present inventions relate to printing equipment and methods, and more particularly to a beverage can decorator, including subsystems and methods relating to same.

Modern cans, such as aluminum beverage cans, are often manufactured in two pieces: a cylindrical container body with integral base and an end that is seamed on to the body after the can is filled with a beverage. The can body is typically formed from a circular metal disk of a 3000 series aluminum alloy (as defined by the industry standard International Alloy Designation System) using a drawing and ironing process. The end includes an opening mechanism, such as an "easy-open" tab or a full-aperture-type pull tab.

Graphics and text are printed on can bodies, such as beverage can bodies, at commercial speeds by rotating machines referred to as decorators. During the printing process in a decorator, mandrels hold can bodies that are placed into rolling contact with print blankets on a rotating blanket wheel. Can bodies are fed onto a turret wheel, also known as a mandrel wheel or a spindle disk, of a decorator typically either through an infeed chute or through an infeed turret. In an infeed chute configuration, a continuous stream of cans is fed from conveyor track work into an infeed section of the can body decorator. In a conveyor stack, the can bodies have a linear "pitch," which is the distance between the centers of adjacent can bodies. The pitch dimension is typically approximately the outside diameter of the can body.

Individual can bodies can be separated from the conveyor stack by a pocketed single rotating turret wheel or starwheel that retains the can bodies in pockets via vacuum. Many decorators include a separator turret that receives can bodies from the infeed device to increase the pitch such that the pitch and peripheral speed of the cans match that of the turret wheel. Often, while on the turret a can body is held in a pocket on a mandrel wheel and is then drawn by vacuum longitudinally onto a mandrel.

For example, U.S. Pat. No. 5,337,659 discloses an infeed system that directs cans into cradles in a pocket wheel. The pocket wheel rotates with a mandrel wheel such that a can body in a pocket of a pocket wheel can be transferred onto the corresponding mandrel of the mandrel wheel.

Often, 24 or 36 mandrels are mounted to the mandrel wheel assembly or the spindle disk assembly. In many commercial decorators, the mandrel wheel assembly is rotated by gearing that is driven by the main gearing from the blanket wheel assembly. The rotational speed of the mandrel wheel assembly matches, and in this regard determines, production output of the decorator.

While the can bodies are mounted on the mandrel, the can bodies are printed with up to eight colors (or more for some machines) in an offset printing process. In the printing process, a discrete ink reservoir of each inker assembly supplies ink (typically of a single color) to a print plate on the circumference of a print plate cylinder. Ink is transferred from the print plates, which typically have artwork etched into their surfaces, to printing blankets on a blanket drum assembly. The printing blankets on the circumference of a rotating blanket drum assembly transfer graphics and text from the blanket to the cans while the cans are on the mandrels of the rotating mandrel wheel assembly. In this regard, the co-operation of the blanket drum assembly and the mandrel wheel assembly transfers colored images from the print blankets to the can bodies.

Some prior art inking configurations include rollers that oscillate back and forth. To achieve the linear motion, the oscillating roller includes a pivoting lever mechanism that co-operates with machine elements, such as a cam. In some configurations, the linear motion of an oscillating roller is achieved by a discrete cam mounted directly on the oscillating roller shaft axis. Further, prior art oscillating roller systems typically have support bearings that are lubricated via a total loss grease system or a total loss oil system.

After rotating the can bodies past the printing blankets, the mandrel wheel carries the mandrels and can bodies to an over-varnish unit, where the contact between the can bodies and an over-varnish applicator roller applies a protective film of varnish over the graphics and text previously applied by the blankets. Over-varnish is often referred to as "OV". The coatings applied over the decorated can body in the over-varnish unit are well known.

As explained above, can bodies, when engaged with the printing blankets and with the over-varnish unit, are located on rotating mandrels. Conventional mandrel wheels have a system to determine when a can body is misloaded on the mandrel. The term "misloaded" is used herein to refer to a can body and/or a mandrel where the can body is either not fully seated on the mandrel, no can is loaded on the mandrel, and/or like failures of loading of the can bodies onto the mandrels). Prior art mandrel wheels often include a mandrel trip system that retracts a misloaded mandrel inwardly sufficient to prevent the misloaded mandrel from engaging with the printing blanket.

The mandrel rotational speed when engaged with the over-varnish applicator roller is one condition that determines the magnitude of angular contact between the can and the applicator roller, which is measured in units of "can wraps" that are equivalent to the circumferential length of the can body. The contact period between the can body and the over-varnish applicator roller is a fixed boundary condition—that is, the period is a fixed proportion of 360 degrees of mandrel wheel rotational movement.

Varnish is applied to the can body through contact between the can body and the over-varnish applicator roller. The over-varnish applicator roller is an element of the over-varnish assembly. FIGS. 31-34 illustrate a typical arrangement of the over-varnish unit that includes an enclosure, a fountain well, a gravure roller, and an over-varnish applicator roller. A metered supply of over-varnish is delivered to the over-varnish applicator roller through the over-varnish unit fountain well and gravure roller machine elements.

Varnish mist is heavy at roller contact points and in the region of the over-varnish unit fountain well. The over-varnish enclosure contains varnish misting caused by the fountain well and contact between gravure roller and over-varnish applicator roller.

In order to achieve process accuracy in the parameters of varnish thickness and varnish weight applied to a can body, the surface speeds of the gravure roller, over-varnish unit applicator roller, and the mandrel/can body are designed to be identical. After the application of varnish at the over-varnish unit, the can bodies are transferred from the mandrels to a transfer wheel and then transferred to a pin chain for curing.

Prior art mandrels are rotated by contact either with a mandrel drive tire, which is mounted on a shaft common with the over-varnish applicator roller, or a mandrel drive belt which contacts the mandrels prior to them contacting the applicator roller. The over-varnish applicator roller, mandrel drive tire and mandrel drive belt are all partially enclosed within the over-varnish enclosure.

Printing beverage cans requires exacting alignment, even after label changes. The quality of the print reflects the alignment of the plate cylinder and printing blankets, among other parts. The alignment or registration is typically judged by inspection of decorated can bodies sampled at the region of the decorated can exit pin chain conveyor. Typically, manual print registration operations are carried out in the region of the color section. This requires either one machine operator to move across the beverage can printing machine between the pin chain conveyor and print registration area, or two machine operators to work co-operatively in a high noise environment.

Typically, axial and circumferential registration is performed by manual movement (that is, by a person's hands) at the mounting interface between the plate cylinder shaft and the plate cylinder. The plate cylinder shaft is a machine element rotationally driven about its own axis and geared to the blanket drum assembly rotational movement.

Another approach is to manually adjust parallel axes lead screws that co-operate with parallel axis-arranged axial and circumferential registration adjustment assemblies, or to manually adjust co-axial lead screws co-operating with circumferential and axial registration adjustment assemblies.

SUMMARY

According to an aspect of one embodiment of the invention, a can body decorator includes combination over-varnish unit and pre-spin assembly. The mandrel pre-spin assembly is located at the inlet to an over-varnish unit and includes: a support frame; a rotatable applicator roller for applying a coating to can bodies after decoration has been applied to the can bodies by a blanket wheel; a pre-spin drive assembly supported on the support structure; and a mandrel drive belt driven by the drive assembly. The mandrel drive belt is configured to contact mandrels for imparting spin to the mandrels before the mandrels are positioned for contact with an applicator roller of the over-varnish unit. The mandrels are on the mandrel wheel and have can bodies loaded thereon.

The pre-spin drive assembly includes a pre-spin drive motor, a pre-spin drive shaft, a mandrel drive belt pulley, and mandrel idler pulleys, such that the mandrel drive belt pulley and the idler pulleys engage the mandrel drive belt.

An over-varnish unit enclosure can house the applicator roller, and the mandrel drive belt is at least partially, preferably wholly, outside the over-varnish unit enclosure to keep varnish mist/contamination away from the mandrel drive belt and pulleys and other drive components. The mandrel drive belt pulley, the idler pulleys, and the mandrel drive belt can be mounted on the motor shaft on a front side of the support frame, and the pre-spin drive motor is mounted to a backside of the support frame such that the pre-spin drive shaft extends through the support frame. The pre-spin drive motor may be controlled independently from a main decorator drive and/or independently to an over-varnish unit drive. The applicator roller can include an over-varnish belt drive pulley that drives the applicator roller of the over-varnish unit.

A corresponding method of applying pre-spin to a can mounted on a rotating mandrel of a can decorating machine can include employing any of the pre-spin and over-varnish unit components above and imparting rotation to the mandrel through contact with the mandrel drive belt before the can bodies contact the applicator roller of the over-varnish unit.

According to another aspect of an embodiment of the invention, a can body decorator assembly includes: a rotatable blanket wheel assembly including plural print blankets adapted for applying text and graphics to can bodies; a rotatable mandrel wheel assembly including plural mandrels adapted for putting can bodies into contact with the print blankets of the blanket wheel; and an over-varnish unit adapted for applying a coating over the can bodies after the can bodies engage the print blankets.

The mandrel wheel assembly can include: an infeed point A at which can bodies are transferred from an infeed mechanism onto the mandrel wheel; a seated point B at which the can bodies are loaded on the mandrels; a trip point C at which misloaded mandrels are inwardly retracted from a peripheral, print-ready position to a bypass position and loaded mandrels remain in a print-ready position; and a printing point D at which the can is engaged with the print blanket; and a reset point E at which the misloaded mandrels are moved to the print-ready position.

An angle A-D measured on the mandrel wheel assembly between infeed point A and printing point D can be between 160 and 200 degrees such that the can body decorator assembly operates at least 1600 can bodies per minute. The over-varnish unit engages the can bodies between the printing point D and the reset point E, and the infeed point A is at a location at which the can bodies initially engage the mandrels.

The angle range of A-D can be 170 to 190 degrees, and the can body decorator assembly operates at least 1800 can bodies per minute; the angle range of A-D can be 170 to 190 degrees, and the can body decorator assembly operates at least 1900 can bodies per minute; and the angle range of A-D can be 170 to 190 degrees, and the can body decorator assembly operates at least 2000 can bodies per minute; and/or the angle range of A-D can be approximately 150-210 degrees, and the can body decorator assembly operates at least 1800 can bodies per minute.

The mandrel wheel assembly can include a mandrel trip mechanism for inwardly retracting the misloaded mandrel relative to the print-ready position, and the print-ready position of the mandrels is such that the can bodies on the mandrels engage the print blankets. The mandrel wheel assembly can include a sensor located near point B that is adapted for engaging a mandrel trip mechanism upon sensing a misloaded can body. The mandrel trip mechanism may be reset from its bypass position at point E. The can bodies may be loaded onto the mandrel by vacuum, and the mandrel wheel assembly can include a compressed air system adapted for blowing a misloaded can body from the mandrel.

DETAILED DESCRIPTION OF ILLUSTRATIVE EMBODIMENTS

Figure 1:
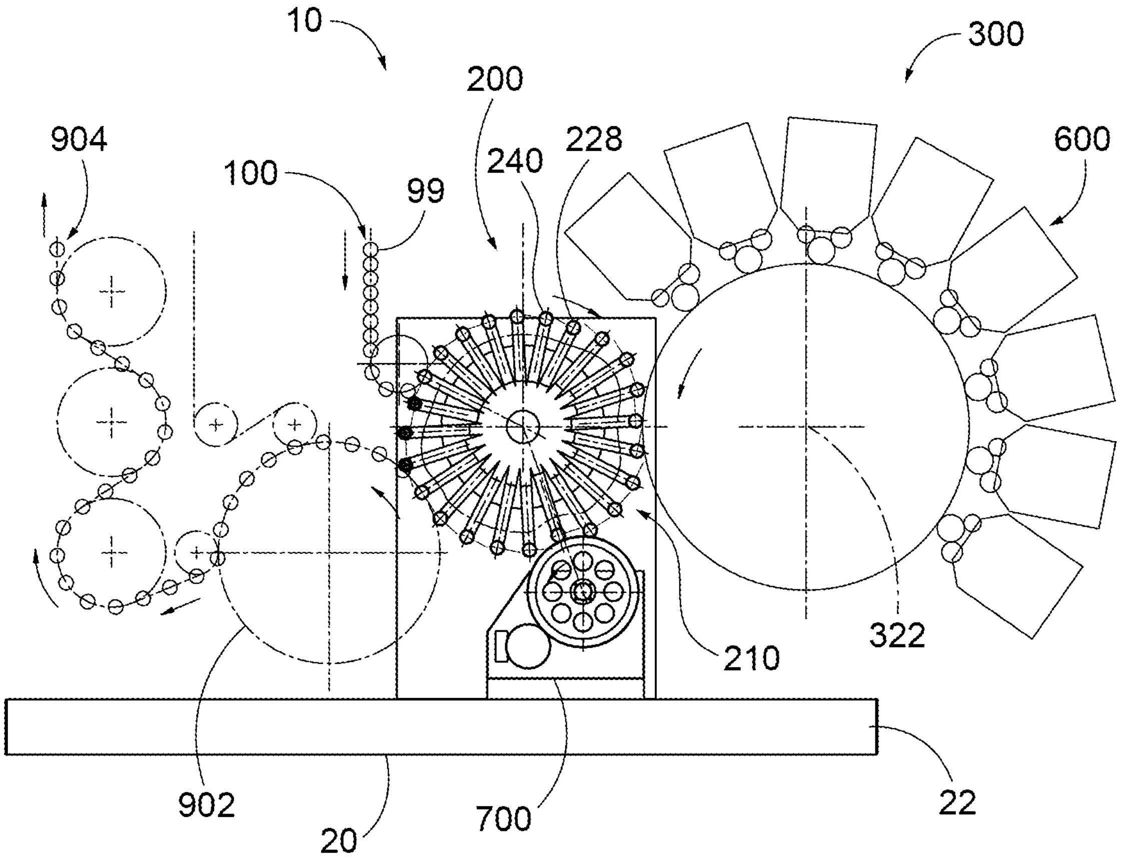
FIG. 1 is a partially schematic, general arrangement of a beverage can decorating machine illustrating aspects of an embodiment of the present invention.

A can body decorating machine or decorator 10 for printing text and graphics on can bodies, such as beverage can bodies 99, includes a structural frame 20; an infeed assembly 100; a print assembly 200; a color assembly 300 that includes a print registration system 400, a temperature regulation system 500, and an inker array 600; an over-varnish assembly 700; and a discharge assembly 900. Some subsystems of decorator 10 are illustrated in FIG. 1.

Can bodies 99 in the embodiment shown in the figures are beverage can bodies, which are drawn and wall ironed can bodies having a base that includes a domed bottom surface inside of a standing ring, a cylindrical sidewall that extends upwardly from the base, and a circular opening opposite the base. The can bodies 99 handled by the infeed assembly 100 typically have an exterior that is uncoated aluminum, sometimes referred to as bright cans. It is anticipated that can bodies 99 are prepared for coating in decorator 10 by conventional preparation and handling techniques that are well known to persons familiar with decorating cans at commercial speeds, often over 1,000 cans per minute and approximately 2,200 cans per minute. Can decorator throughput is chosen to match the upstream and downstream processes such that 2,200 cans per minute is not a practical upper limit, as a modern decorator 10 can achieve greater throughputs (such as 3400 cans per minute) depending on many parameters.

Beverage can bodies 99 typically have a thin sidewall, such as below 0.010 inches thickness and often approximately 0.004 inches thickness for conventional 12 ounce, drawn and ironed (DWI) beverage cans. Because of the thin wall and the open end, can bodies can be subject to crushing or plastic deformation, especially from a transverse (that is, normal to longitudinal) load. Typically, the can bodies are formed of a 3000 series aluminum alloy (as defined by the industry standard International Alloy Designation System). The present invention is not limited to any can body configuration, but rather encompasses can bodies of any type, such as (for non-limiting example) drawn and ironed beverage or food cans of 202 (53 mm), 204.5 (58 mm), and 211 (66 mm) nominal (diameter) size; three piece cans of any commercial size; aerosol cans of 112 (45 mm), 214 (70 mm), and 300 (73 mm); open-top or seamed can bodies; aluminum, such as 3000 series aluminum alloy, tin plate, steel can bodies; and others.

Figure 2A:
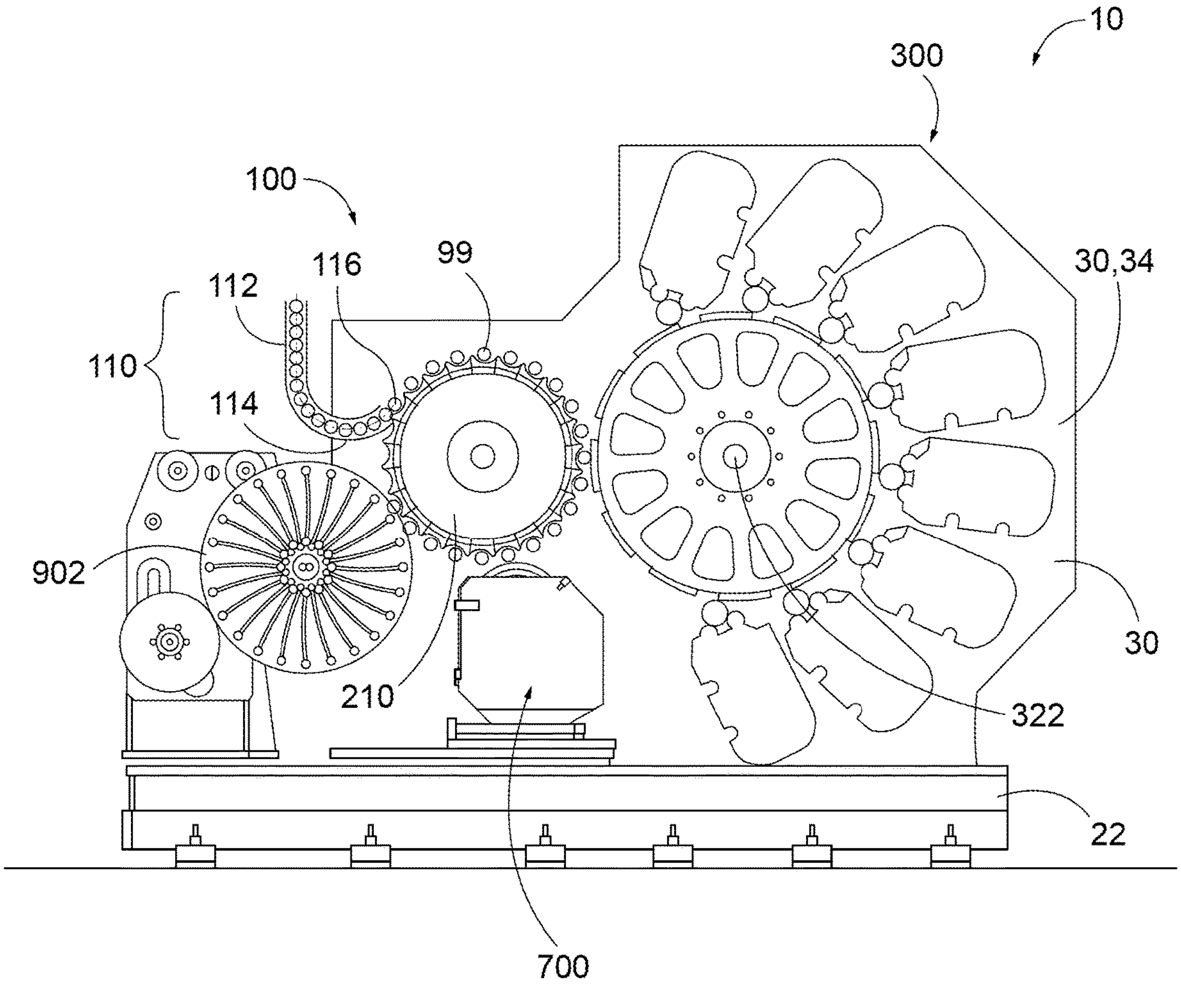
FIG. 2A is a schematic view of a beverage can decorator illustrating an infeed chute.
Figure 2B:
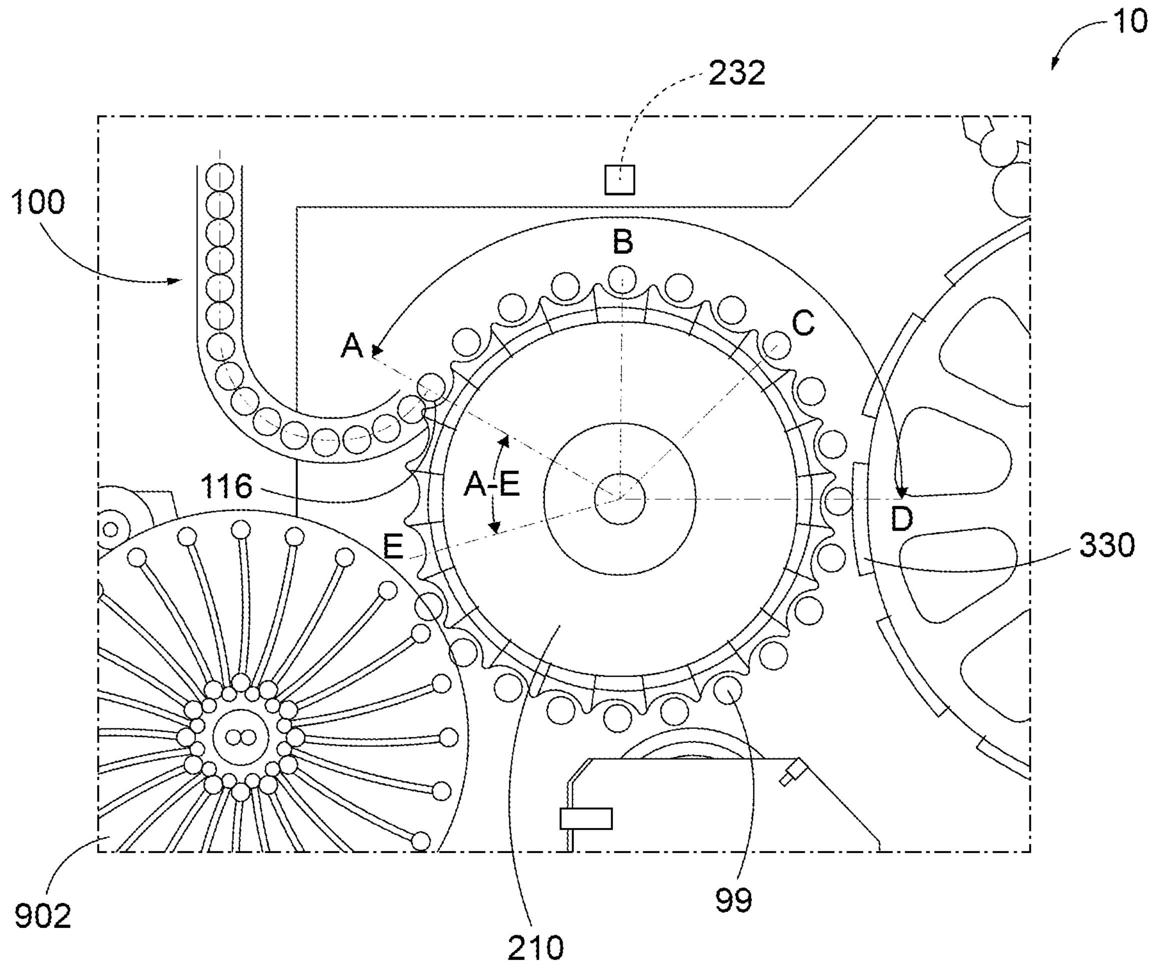
FIG. 2B is an enlarged view of a portion of the decorator of FIG. 2A, illustrating aspects of the mandrel wheel function.
Figure 3:
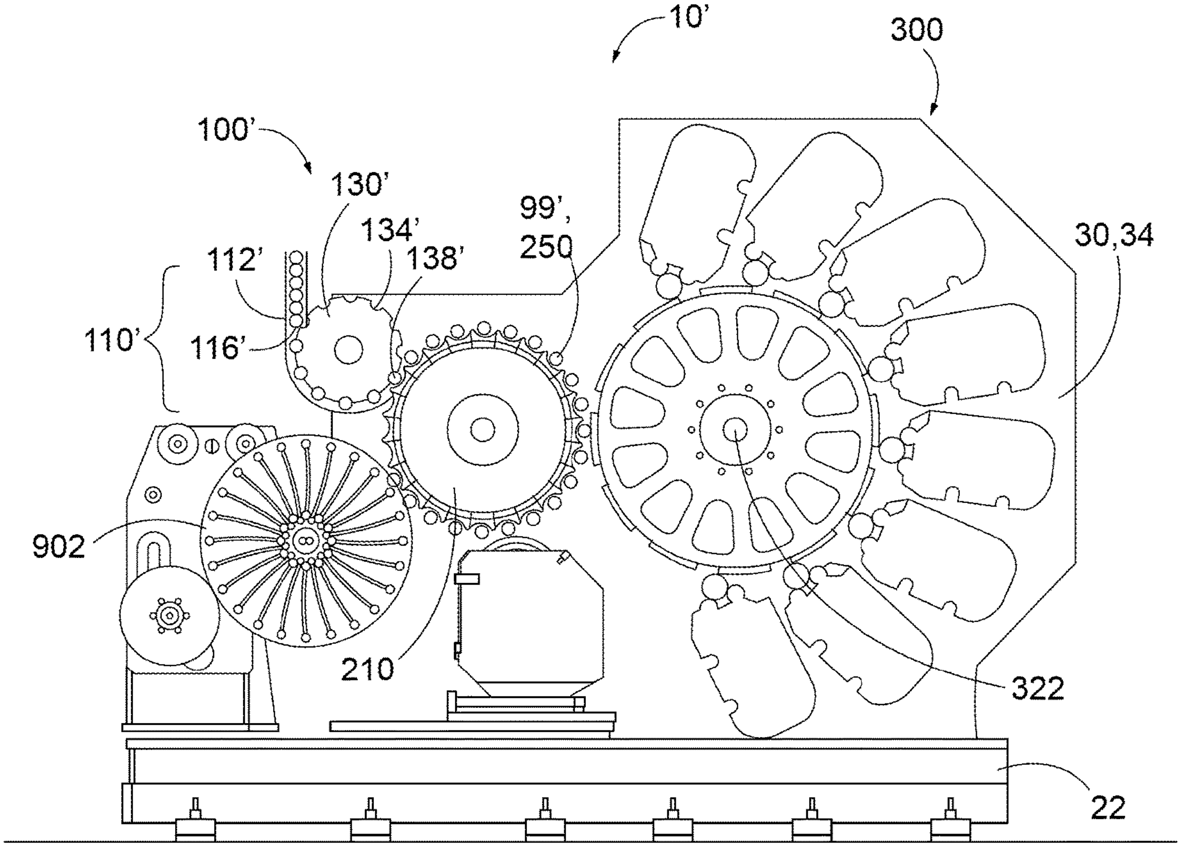
FIG. 3 is a schematic view of a beverage can decorator illustrating an infeed turret.
Figure 8:
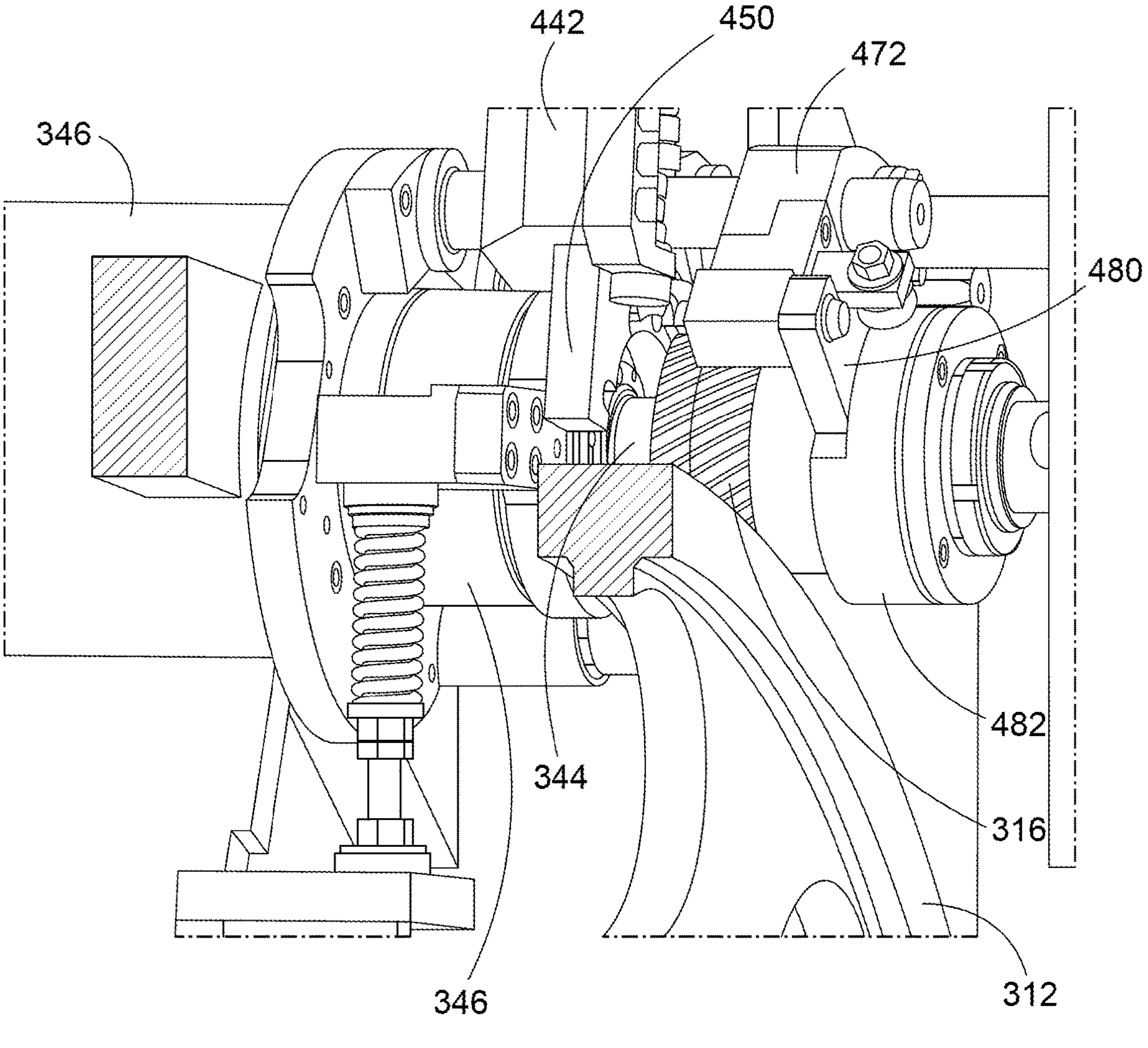
FIG. 8 is another perspective view of a portion of the registration systems and print cylinder assembly illustrated in FIG. 5.

Structural frame 20 includes a base 22 and a machine frame 30, which includes a planar rear face 32 and an opposing front face 34, as illustrated schematically in FIGS. 2 and 3 and best shown in FIG. 8. In this regard, the term "front" refers to the side of the machine having the blanket wheel of the color assembly 300 and the terms "back" and "rear" refer to the side opposite the front, which in the embodiment shown includes the main drive motor. Faces 32 and 34 are enclosed by sidewalls so as to support components of the decorator 10. A portion of the frame 20 may be extended to support infeed assembly 100, as illustrated schematically in FIG. 2. Plural fixed cylindrical supports 38 extend from an inboard portion of front face 34 for supporting the print cylinder assemblies 340, as described more fully below. Frame 20, as well as supports 38, may be formed of cast iron or steel and/or by carbon steel fabrications or a combination of both, as well understood by persons familiar with rotating machinery.

FIG. 2A illustrates a first embodiment infeed feed assembly 100 that includes an infeed chute 110. Infeed chute 110 in the embodiment in the figures includes a vertical portion 112 that holds and guides can bodies 99 in a horizontal, stacked orientation (that is, the longitudinal axis of each can body 99 is horizontal), a curved portion 114 at the base of the vertical portion 112, and a chute outlet/mandrel wheel infeed 116.

FIG. 3 illustrates a second embodiment infeed assembly 100' that includes an infeed chute 110' and an infeed turret 130'. The decorator shown in FIG. 3 is given the designation 10', consistent with illustrating the second embodiment infeed. Infeed chute 110' includes a vertical portion 112' that holds and dispenses can bodies in a horizontal orientation and a can outlet 116' at a lowermost end of vertical chute 112'. Pockets 134' of infeed turret 130' pick up can bodies from the can outlet 116'.

Infeed turret 130' rotates (counter-clockwise in the orientation shown in FIG. 3) to carry can bodies in pockets 134' about the outboard circumference of the starwheel or turret 130'. Pockets 134' are curved-cradle like structures that are evenly spaced about the perimeter of turret 130' and include a vacuum inlet to retain the can bodies 99 in the pockets 134' under vacuum pressure. The pocket structure can be conventional, as will be understood by persons familiar with can body handling in decorators. Can bodies 99 are handed off from infeed turret 130' at an infeed point 138' to a mandrel wheel 210 of the print assembly 200. The mandrel wheel 210 is rotating clockwise (in the orientation in FIG. 3) to carry the can bodies 99 into contact with the print blankets. The angular positions of the infeed point 116 or 138' and other working points about the circumference of the mandrel wheel, such as the point at which the can bodies contact the print blankets, contact the over-varnish applicator roller, retract from the print-ready position, discharge from the mandrel wheel, and the like, may be chosen as explained below.

The mandrel wheel assembly 210 includes a mandrel starwheel or mandrel wheel turret 220 and mandrel assemblies 228. Mandrel wheel turret 220 includes curve-cradle-shaped, peripheral recesses or pockets 222 that receive can bodies 99 from infeed system 100/100'. As turret 220 rotates about an axis defined by a mandrel wheel shaft 212, a vacuum is applied at each pocket 222 to retain the can body 99. The structure forming pocket 222 is not symmetrical about a radial line to enhance its ability to pick up can bodies 99, as is conventional.

In the embodiment illustrated in the figures, the mandrel wheel 210 is driven by its own mandrel wheel drive (not shown in the figures) that includes a mandrel wheel drive motor. Other configurations, such as gearing transmitting torque from the main drive system 304 are contemplated.

At commercial decorator speeds, loading the can bodies 99 onto the mandrels 230 repeatably without error can be a challenge. Incorrectly loaded can bodies can cause excessive spoilage, machine downtime, and in some cases damage to parts of the mandrels, printing blankets, or other components.

Figure 29:
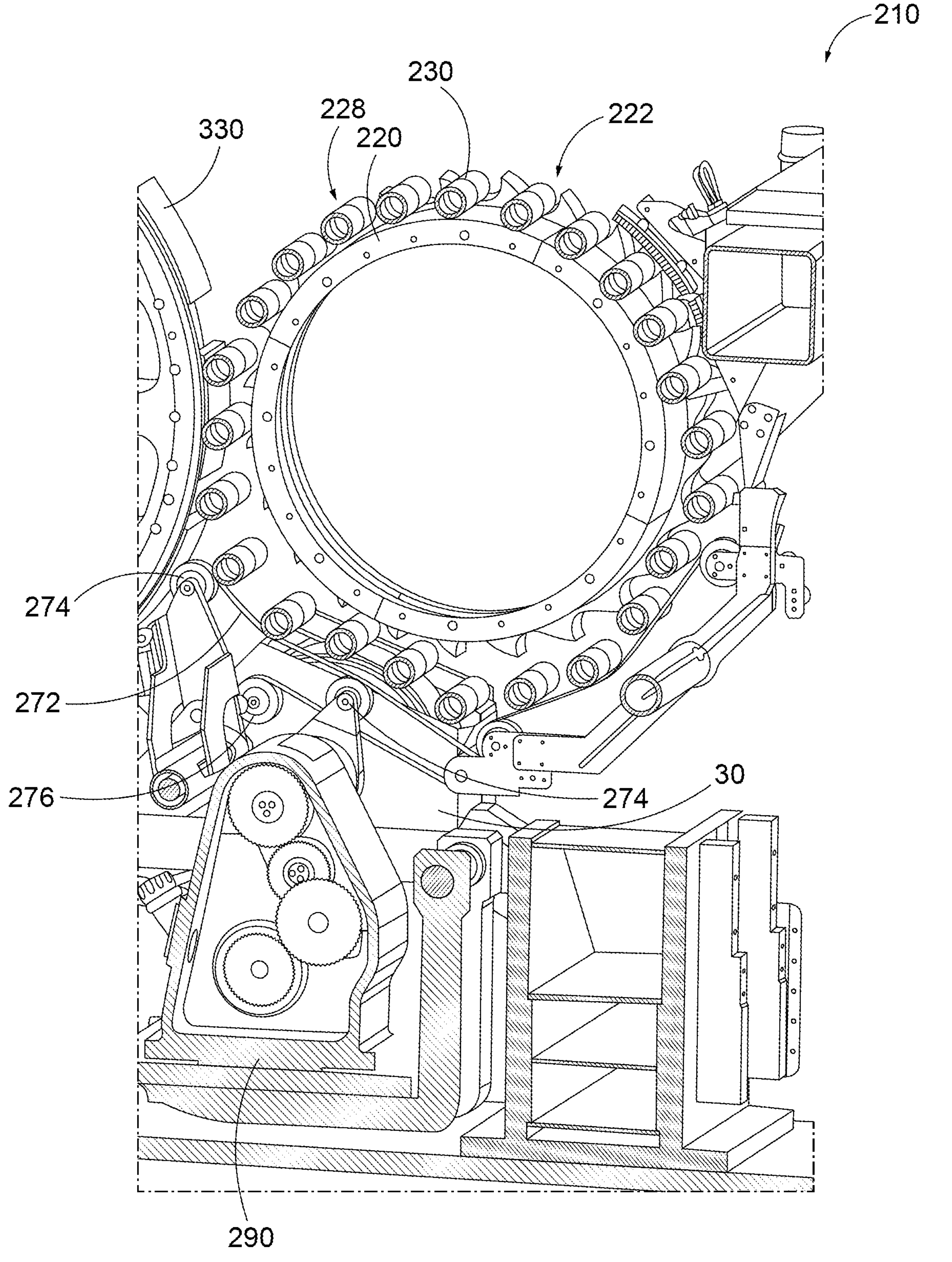
FIG. 29 is an enlarged, perspective, part-cross-sectional view of a mandrel wheel according to an embodiment of the present invention.
Figure 30:
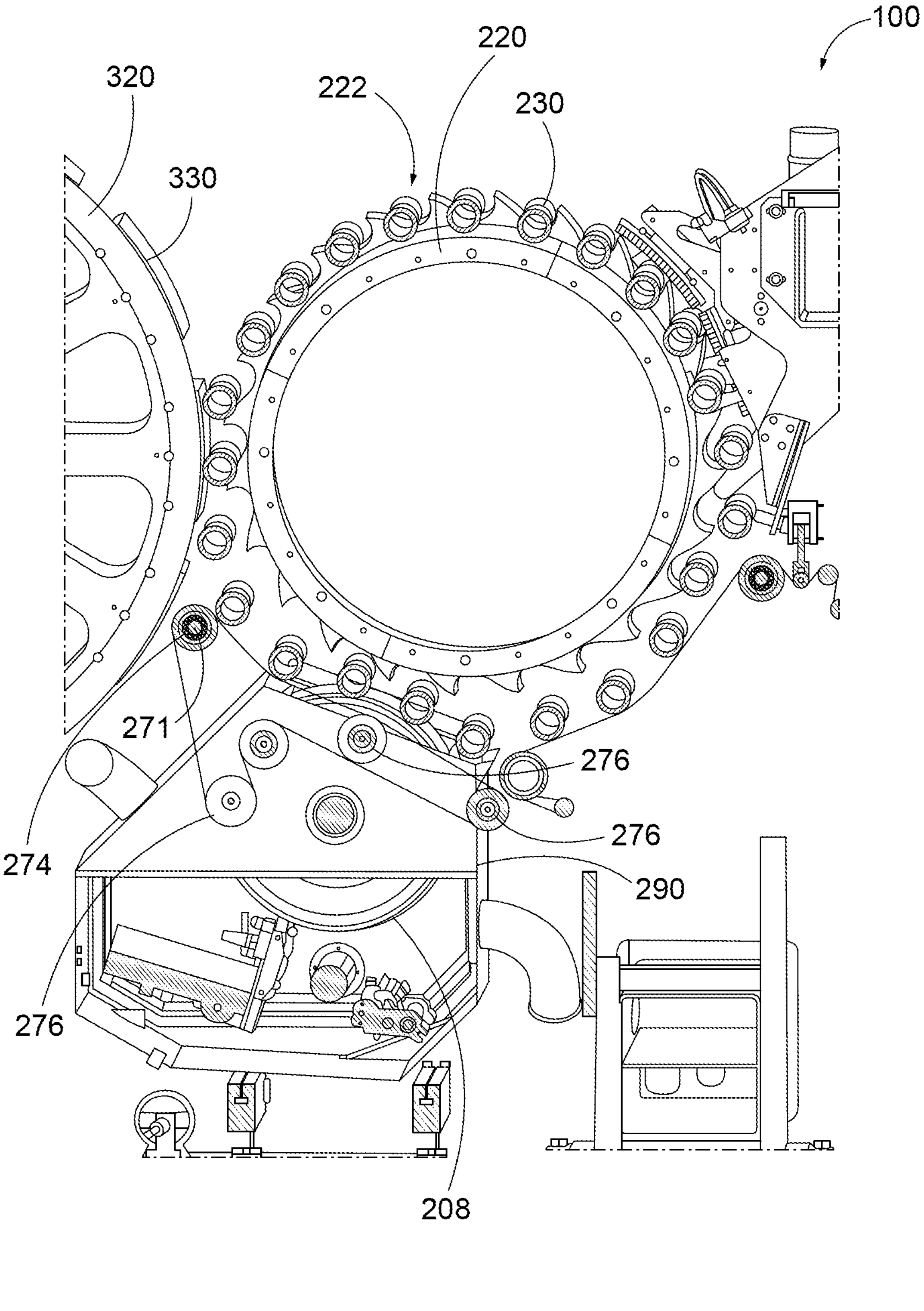
FIG. 30 is another enlarged, perspective, part-cross-sectional view of the mandrel wheel of FIG. 29, with the cross-section taken at another cross-sectional position.
Figure 31:
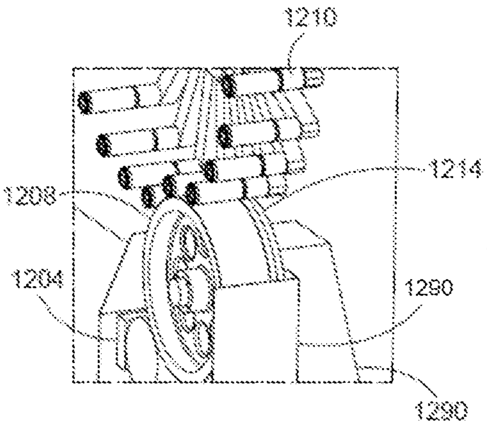
FIG. 31 (PRIOR ART)
FIG. 31 (Prior Art) is a perspective view of a portion of prior art over-varnish unit and mandrel wheel.
Figure 32:
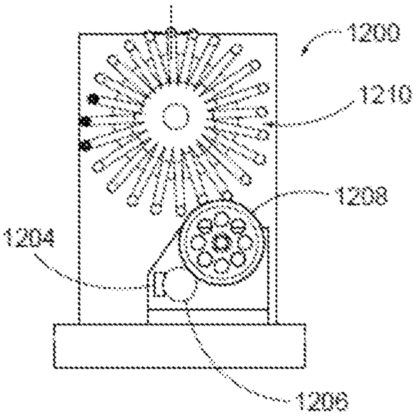
FIG. 32 (PRIOR ART)
FIG. 32 (Prior Art) is another view of the structures of FIG. 31.
Figure 33:
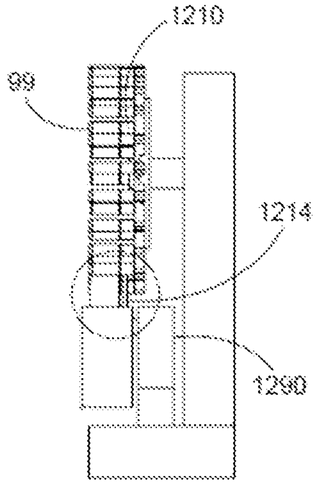
FIG. 33 (PRIOR ART)
FIG. 33 (Prior Art) is another view of the structures of FIG. 31.
Figure 34:
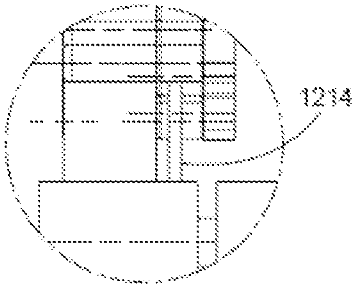
FIG. 34 (PRIOR ART)
FIG. 34 (Prior Art) is an enlarged view of the structure of FIG. 33.

Pockets 222 are configured and spaced such that each pocket 222 aligns with a corresponding one of the mandrels 230, as illustrated in FIGS. 29 and 30. Can bodies 99 are transferred longitudinally from pockets 222 of the mandrel wheel 210 onto the mandrels 230 by vacuum. Each mandrel 230 is capable of rotating about its longitudinal axis, as is well known. As mandrel wheel 210 carries the can bodies 99 into engagement with printing blankets 330 of the blanket drum assembly 320, mandrels 230 rotate as needed in response to contact with the printing blankets.

Mandrel assembly 228 includes individual mandrels 230 and mandrel arm assemblies 240, which include mandrel trip assemblies 250. Mandrel assembly 228 rotates on shaft 212 in common with turret 220.

Mandrel arm assemblies 240, shown schematically in FIG. 1, carry mandrels 230 and include the mandrel trip assemblies 250. Arm assemblies 240 carry the mandrels 230, and when loaded, also can bodies 99, about the circumference of mandrel wheel 210. While carried by the arm assemblies 240, mandrels 230 follow a predetermined path that may be chosen according to known parameters. The arm assemblies may also enable the mandrels to radially retract, as needed, to apply desired contact pressure of a can body 99 with a print blanket 330. Further, the mandrel trip assembly 250 retracts the mandrel 230 from a print-ready position (that is, a diametral position at which a can body 99 contacts a print blanket during normal printing) to a retracted or bypass position (that is, in which the diametral position—reflected in the radial distance of the mandrel 230 from the axis of shaft 212—at which a can body 99 does not contact the print blanket) upon sensing that the mandrel or can is misloaded.

The present invention is not intended to be limited to the structure of any particular mandrel arm assemblies or manual trip assemblies disclosed herein unless expressly required by the claim. Rather, the present invention encompasses any structure and method relating to the arm assemblies and trip assemblies consistent with the functions described herein.

In current decorators, there are two main types of systems for mandrel trip. First, in a "carriage trip" system, the mandrel wheel assembly separates from the blanket drum such that the mandrels, as a whole, do not engage the print blanket. Second, in a "single mandrel trip" system, individual mandrel assemblies are capable of moving independently of other mandrels assemblies to retract from a print-ready position (that is, a position, including a radial position or dimension on the mandrel wheel, in which a mandrel/can body is about to engage a print blanket of the blanket wheel). The term retract preferably includes diminishing the radial or diametral position of the mandrel using well known features of can decorator mandrel wheels.

Decorator 10, in the embodiment of the figures, has 'single mandrel trip' functionality and features, in which individual mandrels may independently 'trip' out of their print-ready position to avoid any of the mandrels, if misloaded, being printed when no can is present or the can is not loaded sufficiently or the can is defective. Points that define an angular or circumferential position on the mandrel wheel 210 are explained below. The angle range(s) provided below, which are larger than those in conventional beverage can decorators, are chosen to address problems associated with increasing throughput of beverage can decorators, such as approaching or (in the future) exceeding 2000 can bodies per minute.

FIG. 2B is an enlarged view of decorator 10 illustrating an infeed configuration. The infeed system is shown only for illustration, as it is not intended that the structure or functional details limits the scope of the invention relating to the mandrel wheel unless expressly set out in the claims. A point A—referred to as the infeed point—defines the point relative to mandrel wheel 210 at which the can bodies 99 are released from infeed system 100/100' to load onto the mandrel wheel 210. Each pocket 222 includes a passage or hole through which vacuum is pulled to urge the can body 99 onto the mandrel pocket 222 and to retain can body 99 in pocket 222, as explained above. Typically, a guide is provided to push the can body 99 towards the mandrel 230 from pocket 222 of the mandrel wheel 210 after or downstream of point A. Point B—referred to as the seated point—is the circumferential point on the mandrel wheel assembly 210 at which the can body 99 should be fully seated or loaded onto the mandrel 230. As explained above, vacuum may be employed to load or aid in loading each can body 99 onto the corresponding mandrel 230. A sensor 232, which preferably is conventional and is illustrated schematically, at point B detects whether the can is fully and appropriately loaded onto the mandrel. Any conventional sensor may be employed, as will be understood by persons familiar with conventional decorator technology.

At point C—referred to as the trip point—air pressure is used to remove (that is, blow off) a can from the mandrel if the can is detected by the sensor at B as incorrectly loaded onto the mandrel or otherwise so defective that the sensor 232 identifies it as requiring removal, thus preventing possible damage to the printing blankets and other equipment. Also at point C, a misloaded mandrel is 'tripped' out of print position by mandrel trip mechanism 250 to avoid printing the surface of a misloaded mandrel 230 when no can body 99 is present. Trip mechanisms 250 are known in the art, and the present invention contemplates employing any trip mechanism. At point D—referred to as the printing point—the can bodies 99 are printed by engagement between the can bodies 99 and the print blankets 330. For accuracy, point D may be defined by the point of initial contact of the can body with the print blanket 330.

At point E—referred to as the reset point—any misloaded mandrels which were tripped out of the print-ready position are reset to their default diametral position to allow further can bodies 99 to be loaded onto the mandrel wheel 210. As explained below relative to the over-varnish unit, can bodies are discharged from mandrel wheel 210 to the discharge system 900.

The above sequence of mandrel wheel events requires precise timing and coordination between pneumatic & mechanical systems to occur correctly. At high speeds (particularly as machine speeds approach 2000 can bodies per minute) there is a danger that there is not sufficient time to perform them correctly, at least without very precise setup by skilled operators. In this regard, the time between points A and D (that is, betting loading of the can bodies 99 onto the mandrel wheel and printing) must be sufficient to achieve loading, verification of loading and sensing errors, and tripping (if needed), but is constrained by the requirement that the can bodies 99 pass through the over-varnish unit after engagement with the print blanket 33, and then have sufficient time for the reset step for the retracted mandrels (after the over-varnish unit) before the mandrel loading process begins again. The master cam (for controlling the path of the mandrels) for such a procedure must also be designed to achieve the functions described herein. Ultimately, this acts as an upper limit to the speeds the machine can be expected to run under normal operating conditions.

The stated angle, especially angle A-D in the range of 160 to 200 degrees, is such that the decorator machine 10 can be suitable (as the inventors surmise) to run at high speed (approximately 2000 cpm), is easier to set up as the process window reflected by the angle is opened, and less liable to produce scrap can bodies. To achieve the structure and function described herein, a master cam profile is designed, such as according to complex cam profiles (for example, 7th order polynomial curves), as will be understood by persons familiar with beverage can decorator design in view of the present disclosure.

Thus, the inventors surmise that to allow the machine to run at higher rotational speed and higher can throughput, and to be easier to set and to be less liable to create spoilage, the time interval (and therefore the angle A-D at a given mandrel wheel rotational speed) between the infeed & the print position is increased in the current invention. The angle A-D is set by the design of the 'master cam' (which controls the relative motion of the decorator parts); altering the design of the master cam allows more time between points A and D. Designing the master cam to optimize angle A-D, while also choosing angle E-A, to increase angle A-D to within a range, for example, of 160 degrees to 200 degrees gives the current invention an advantage over existing machines. The structure of the master cam (not shown in the figures) and engineering the master cam to achieve the functions described herein will be understood by persons familiar with can decorator technology in view of the present disclosure.

Figure 4:
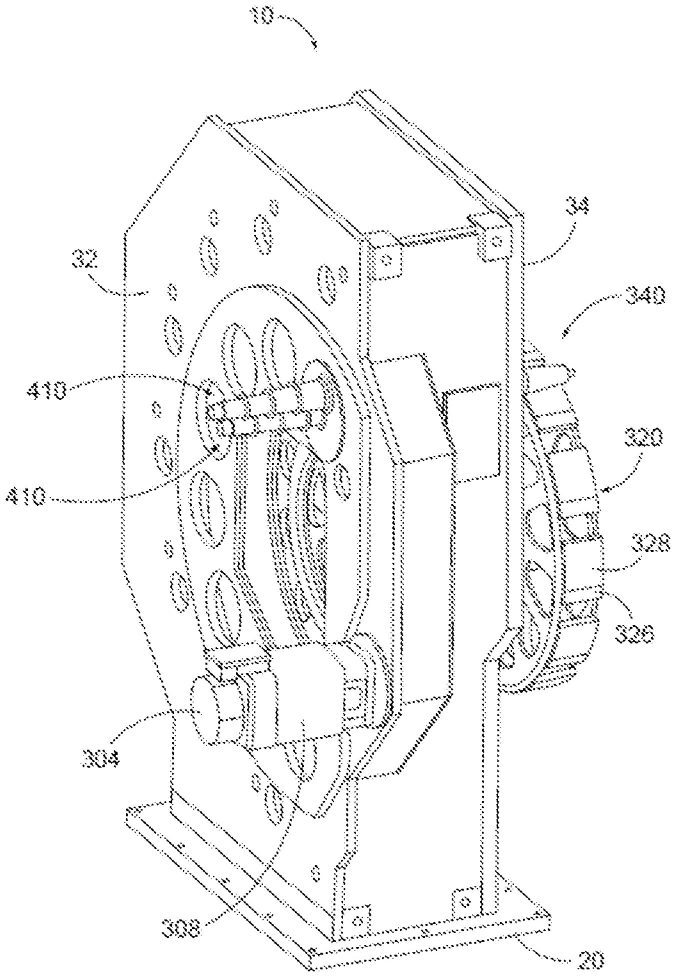
FIG. 4 is a perspective view of a color portion of the beverage can decorator.

Color assembly 300 is supported by machine frame 20 and includes a main drive 304 (FIG. 4), a blanket drum or blanket wheel assembly 320, plate cylinder or print cylinder assemblies 340, a print cylinder registration system 410, a temperature regulation system 500, and an arrays of inker assemblies 600. Main drive 304 includes a motor and gearbox 308 that is mounted to frame rear face 32 and a main drive gear 312, which preferably is helical, as described more fully below.

Blanket wheel assembly 320 includes a horizontal main shaft 322 (indicated in relief in FIGS. 1 and 4) that is common with main drive gear 312 and supported by bearings (not shown in the figures). A drum or wheel 326 is mounted to shaft 322 such that drive 304 rotates wheel 326 at a desired rotational speed. A periphery of wheel 326 includes several pads 328 that are curved or circumferentially shaped such that the radially outboard surface of the pads 328 lie on the circumference of wheel 326. Blanket wheel pad 328 can be a conventional print pad for receiving ink decoration from the plate cylinder 350.

Print cylinder assemblies 340 and inker assemblies 600 are housed or supported by machine frame 20 such that wheel 326 rotates relative to the print cylinder assemblies 340 and inker assemblies 600. Each inker assembly 600 of the array is associated with one color ink and each inker is associated with its own print cylinder assembly 340 such that each plate cylinder 350 can apply a single color to each print cylinder 350, which then transfers its single-color image to the rotating blanket 330. Each one of the plate cylinders 350 can have a unique pattern, image, text, and like that corresponds to the desired color that when combined provides a complete can decoration to the blanket 330.

As blanket 330 contacts plate cylinder 350, plate cylinder 350 rotates approximately one revolution. The blankets and plate cylinder materials and structure can be conventional. In FIGS. 1 through 3, eight print cylinder assemblies are schematically shown. In FIGS. 4 through 10, only one print cylinder assembly is shown for clarity, as it is understood that the seven openings in the housing wall 32 in FIG. 2 preferably houses print cylinders. The present invention encompasses a decorator having any number of print cylinders according to well-known parameters, such as the desired number of colors to be applied to the can bodies.

Figure 5:
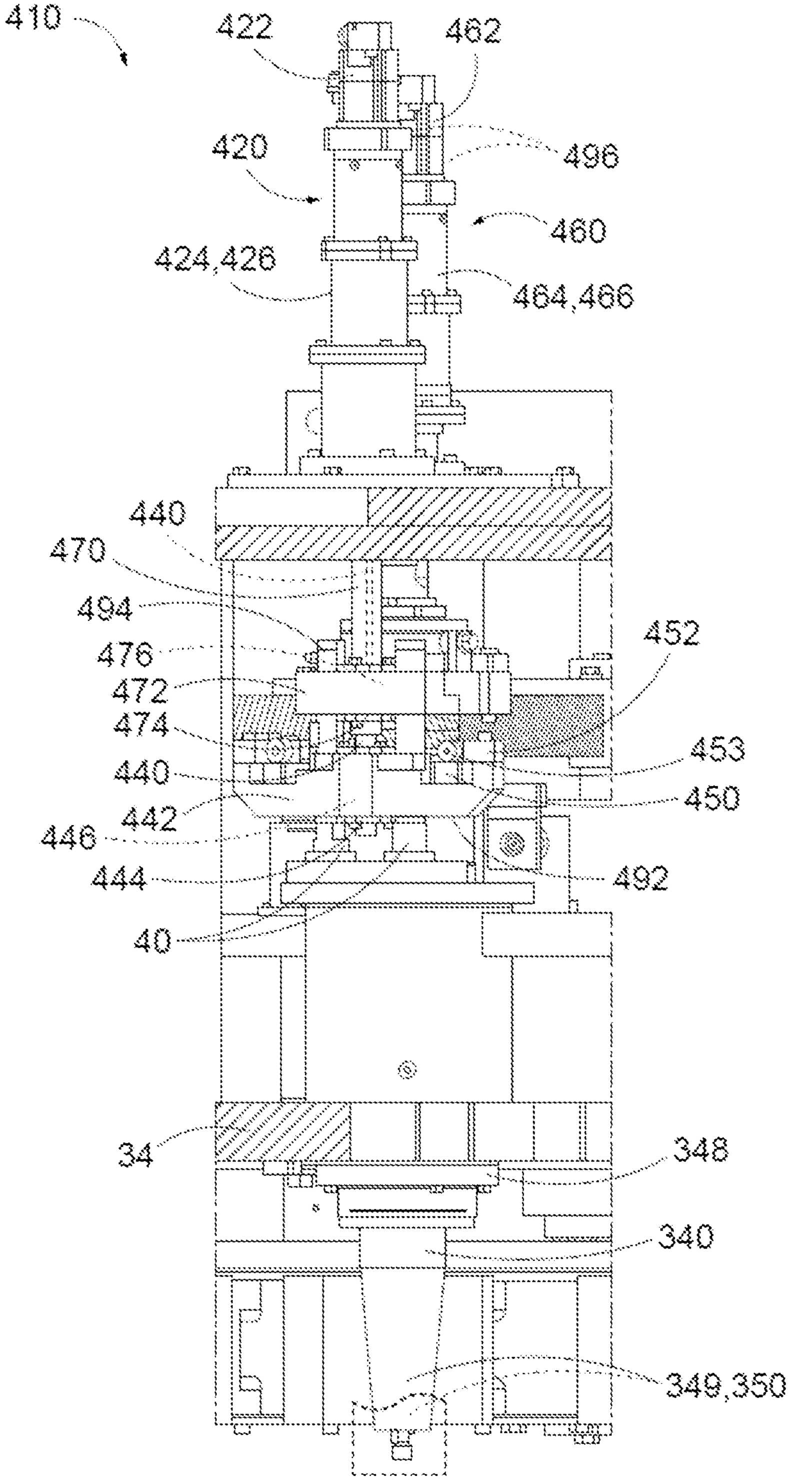
FIG. 5 is a top view of the axial and circumferential registrations and print cylinder assembly, shown by removing a portion of the machine frame.

As illustrated best in FIG. 5, each print cylinder assembly 340 includes a print cylinder shaft 344 having a tapered distal end surface 349 on which a plate cylinder 350 (shown by a relief line in FIG. 5) is mounted. The taper at surface 349 is optional, as other means for joining shaft 344 to plate cylinder 350 are known. Shaft 344 extends from an interior of the machine frame 30 through front face 34 such that end surface 349 is exterior to or outside of the enclosure of frame 30. Print cylinder shaft 344 is supported by a main bearing 348 that is supported by front face 34 and internal bearings (not shown in the figures) located between print cylinder shaft 344 and an inboard surface of sleeve 346.

Frame 30 includes the hollow, cylindrical print cylinder structural support 38 that extends inwardly from the front face 34. A print cylinder sleeve 346 is located within support 38 and is capable of movement relative to support 38. In the embodiment of the figures, sleeve 346 (as best shown in FIG. 8) is prevented from rotation by a spring-loaded support that is affixed to a portion of the machine frame and the sleeve. Accordingly, sleeve 346 does not rotate with print cylinder shaft 344. Rather sleeve 346 is capable of axial translation, which translation (forward and rearward) is imparted to print cylinder shaft 344 and print cylinder 350. The magnitude of axial translation of sleeve 346 may be chosen according to the desired magnitude of axial registration of print cylinders 350. Sleeve 346, in some embodiments, is capable of a small amount of angular movement or rotation to accommodate circumferential registration.

A helical gear 316 is mounted on shaft 344 within housing frame 30 and aligned to engage main drive gear 312, which can be driven by main drive motor 306 and gearbox 308. During operation, main gear 312 drives shaft 344 through helical print cylinder gear 316, as shaft 344 rotation is supported by bearing 348 and internal bearings.

As explained above, while the can bodies 99 are on the mandrel wheel assembly 210, a can body is brought into contact with a blanket 330 of rotating blanket wheel 326 to transfer the ink from blanket 330 to the outer surface of the can body 99.

Can bodies 99, after contact with the printing blankets 330, receive an over-varnish from the over-varnish system 700. The cans exit the mandrel wheel assembly 210 after the over-varnish application when they are handed off to discharge assembly 900.

The print plates 350 of beverage can decorators are typically registered—that is, aligned with a high and repeatable degree of accuracy—to a common datum such that the specified artwork design is accurately transferred onto print blankets 330. Each one of the print plates 350 is registered with other ones of the print plates both axially (that is, longitudinal along axis of rotation of the plate cylinder 350 and can bodies 99) and circumferentially (that is, angularly relative to the rotation of the print blanket and can bodies 99).

In the embodiment of the figures, a registration drive gear train is configured to combine the rotary motion of an axial print registration drive motor 424 and a circumferential print registration drive motor 462 into a co-axial output-shaft configuration. Rotary motion of an axial registration shaft is converted to linear movement or displacement of an axial registration slide assembly 442, which linear movement or displacement is transferred to the plate cylinder 350 through the print cylinder shaft 344. Rotary motion of a circumferential registration shaft is converted to linear movement or displacement of a circumferential registration slide assembly, which linear movement or displacement is transferred to the helical gear 316. Liner movement or displacement of helical gear 316 is converted to angular or circumferential movement or displacement of print cylinder shaft 344 (to which gear 316 is mounted) when pushed against stationary helical main gear 312, which circumferential movement or displacement is transferred to print cylinder 350 by print cylinder shaft 350.

As illustrated in FIGS. 4 through 10, an automated print plate registration assembly 400 includes an axial alignment or registration assembly 420 and a circumferential alignment or registration assembly 460. Axial registration system 420 moves plate cylinder 350 preferably only by translation in the longitudinal or axial direction. Circumferential registration system 460 preferably moves plate cylinder 350 only circumferentially, although a small amount of axial movement during circumferential registration may occur in some instances in some embodiments. The present invention is not limited to registrations that each move only axially and only radially. Rather, other configurations, in which one registration system simultaneously registers the plate cylinders both axial and circumferentially coupled with another registration system that registers the plate cylinders in only one of the axial and circumferential configurations may also be employed.

Referring again to FIGS. 4 through 10, axial registration system 420 for each one of the plate cylinders 350 includes an axial print registration drive 422, an axial registration shaft 440 (also referred to as a lead screw in accordance with the embodiment shown in the figures) coupled to an output shaft of drive 422, an axial system slider 442, an axial registration system nut 444 that is affixed to slider 442 and in a threaded connection with lead screw shaft 440, axial registration assembly linear bearings 446 in slider 442, a transfer plate 450 that translates with slider 442, and a clamp 452 for affixing slider 442 to transfer plate 450. Axial system slider 442 has a pair of through-holes for mounting linear bearings 446 such that slider 442 can translate on a pair of fixed, parallel, horizontal, support arms 40 that extend from the inboard portion of the front face 34 of the machine frame 30. Axial registration drive 422 can include a motor 424 and a gearbox 426 in a housing 428 that is mounted to frame 30.

Circumferential print registration system 460 for each one of the printing plates or plate cylinders includes a circumferential registration drive 462, a circumferential registration shaft (also referred to as lead screw) 470 coupled to an output shaft of drive 462 via gears **490*a* and 490*b* or other transmission, a circumferential system slider 472, a circumferential system nut 474 that is affixed to slider 472 and in a threaded connection with lead screw 470, circumferential system linear bearings 476 in slider 472 for enabling slider 472 to translate on fixed support arms 40, a transfer arm 480, a hub 482 that is attached to slider 472 by transfer arm 480, and a key (not shown in the figures) for affixing a hub bore to driven gear 316**. At least one human machine interface panel (HMI) is also provided.

The present invention is not limited to the use of gears **490*a* and 490*b*. For non-limiting example, a belt and pulley arrangement or a chain and sprocket arrangement are alternative options for the registration drive gear train. The term "transmission" is used to refer to any means for transmitting torque, such as a gear train, belt and pulley system, sprocket assembly, and the like. Circumferential registration drive 462 can include a motor 464, a gearbox 466, and a housing 468 that is mounted to frame 30**.

The axial and circumferential registration slide linear bearings 446 and 476 can be, for non-limiting example, circular plain bore bearings, prismatic plain bore bearings, ball bush bearings, recirculating ball bush bearings, or recirculating ball prismatic bearings. Lead screws shafts 440 and 470 are constrained to the machine frame such that shafts 440 and 470 rotate but do not move axially.

The motors of drives 422 and 462 may be of any suitable type that is capable of performing the registration functions described herein, such as alternating current induction motor—ac motor, stepper motor or servo motor, direct current motor—dc motor, hydraulic motor or pneumatic motor. Each motor type will be accompanied with the appropriate control system hardware and software logic. A gearbox at the output shaft of the motor may be employed.

The HMI (not shown in the figures) can be any interface that enables a user and/or a control system to actuate one or both of the axial registration system and circumferential registration system.

In the embodiment in the figures, the axial registration drive 422 and the circumferential registration drive may be any type that can accurately and repeatably move or index axial registration slider 442 and circumferential slider 472, respectively, to desired position. The axial registration drive 422 and the circumferential registration drive 462 may be arranged on parallel axes, that is, the drives may be mutually parallel. Alternatively (not shown in the figures), the axial print registration drive motor and circumferential print registration drive motor could be arranged on perpendicular axes or in other configurations. Further, the present invention encompasses the registration drive motor being a linear actuation type connected directly to the registration slide assembly, which in some configurations includes the registration lead screw and lead screw nut, or eliminates the registration lead screw and lead screw nut.

In the embodiment of the figures, the circumferential registration lead screw 470 and axial registration lead screw 440 are arranged co-axially. The circumferential registration lead screw and axial registration lead screw may be, for example, a cut screw thread, recirculating ball track type—also known as recirculating ball screw type. The circumferential registration slide assembly and axial registration slide assembly are configured with accompanying discrete lead screw nut. In the embodiment of the figures, each lead screw nut is constrained to the accompanying registration slide assembly.

Referring again to the embodiment shown in figures, the axial print registration drive 422 is coupled to an inline axial registration lead screw (or shaft) 440 that is coaxial and inside of the circumferential registration lead screw 470. Shaft 440 extends through the body of axial registration slider 442 and through axial registration system bearings 446, which preferably are conventional slide bearings. Shaft 440 extends through nut 444, which is fixed on slider 442, such that rotation of shaft 440 translates slider 442. The term "nut" and "lead screw" are used herein to refer to any type of structure that enables the conversion of rotary motion of the screw or shaft into linear translation.

In operation, actuation of axial drive 422 rotates axial registration shaft 440, which translates axial registration slider 442 forward or rearward relative to decorator 10 (or distally or proximally, respectively, relative to the axial drive 422) on support arms 40.

Figure 6:
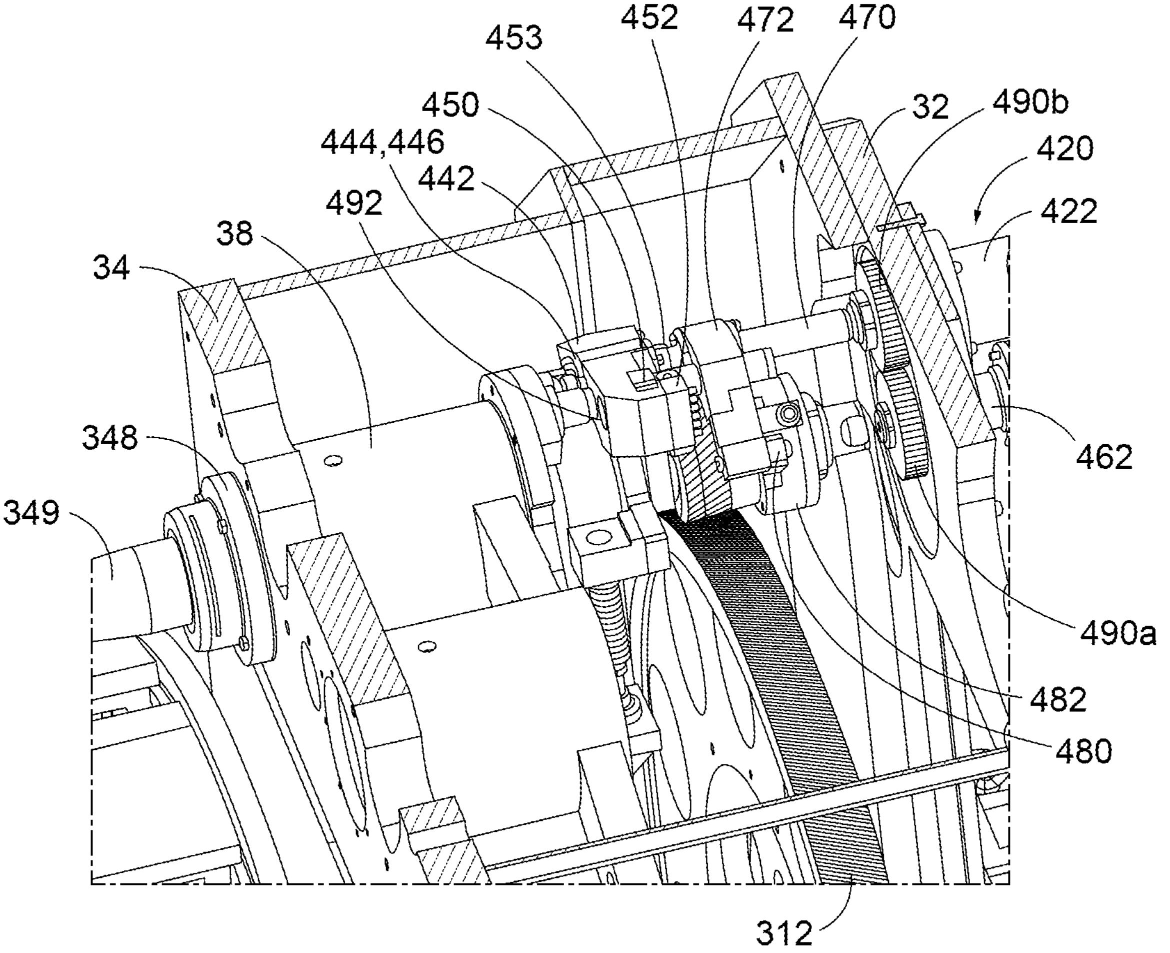
FIG. 6 is a perspective view of the portion of the registration systems and print cylinder assembly illustrated in FIG. 5.
Figure 7:
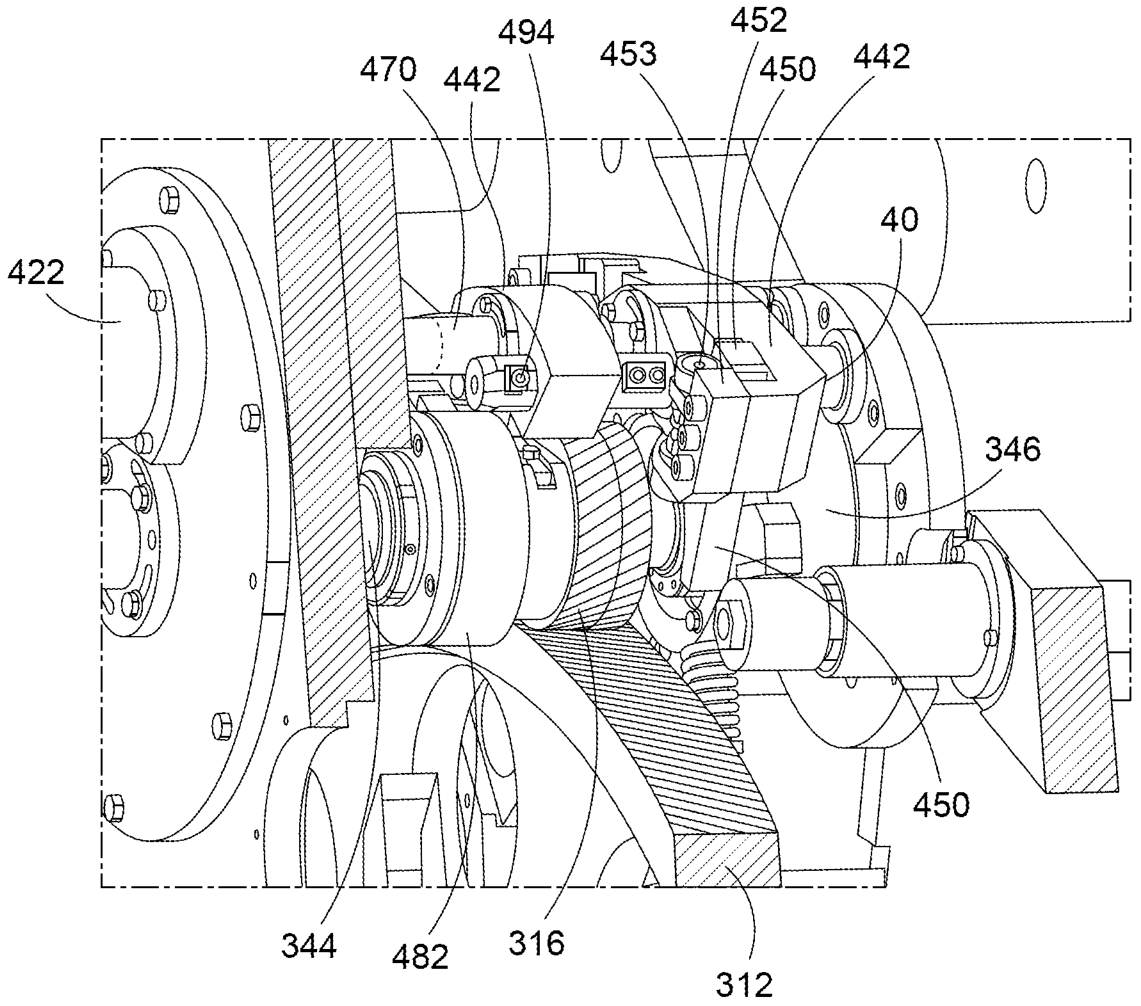
FIG. 7 is another perspective view of a portion of the registration systems and print cylinder assembly illustrated in FIG. 5.
Figure 9:
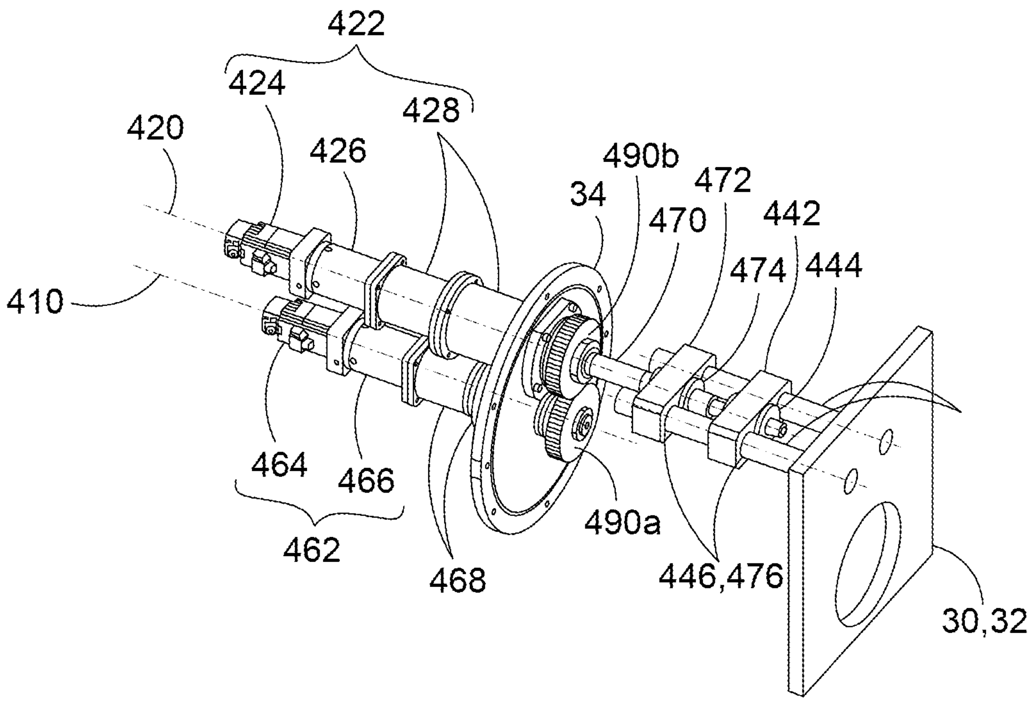
FIG. 9 is a perspective view of the registration systems with portions of the decorator removed for clarity.
Figure 10:
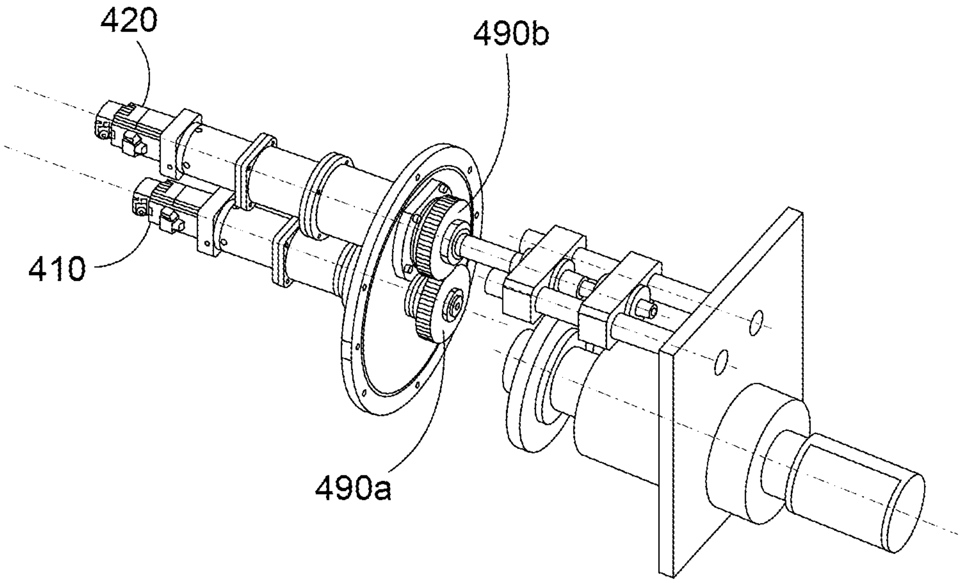
FIG. 10 is another perspective view of the registration systems with portions of the decorator removed for clarity

The circumferential registration drive 462 has a gear 490*a* mounted on an output shaft, shown as the bottom gear in FIGS. 6, 9, and 10. The bottom gear 490*a* is engaged with an upper gear 490*b* that is mounted on the circumferential registration shaft 470, through which the axial registration lead screw 440 passes. Accordingly, circumferential registration lead screw 470 is attached to the upper gear 490*b* such that rotation of the motor of the circumferential drive 462 rotates the lower gear 490*a,* which transmits torque to the circumferential lead screw 470 through the upper gear 490*b.* The circumferential slider 472 is attached to the circumferential lead screw 470 as described above. The axial registration slider 442 is attached to the axial registration lead screw 440 as described above. Thus, the circumferential slide assembly and axial registration slider assembly are inline, and co-axial in the embodiment of the figures, and independently adjustable and capable of independently adjusting the position of print cylinder 350.

Any mechanism for moving the plate cylinder 350 based on the axial registration slide assembly 420 movement may be employed. And any mechanism for moving the plate cylinder 350 based on the circumferential slide assembly movement may be employed. For general example of the axial registration mechanism, there can be a mechanical connection between the first (axial) registration slide assembly and the sleeve associated with the plate cylinder such that fore and aft movement of the registration slide assembly causes fore and aft movement of the plate cylinder.

In the embodiment illustrated in the figures, axial registration slider 442 is affixed to a U-shaped, vertically oriented transfer plate 450. A pair of upstanding arms of transfer plate 450 are held to a rearward face of axial registration slider 442 by a pair of clamps 452. One clamp 452 is applied to a left arm of plate 450 and the other clamp 452 is applied to a right arm of plate 450. A lower portion of plate 450 is affixed to sleeve 346. A pair of cam screws 453 for holding the clamps 452 to transfer plate 450 can be eccentric or tapered such that the clamps 452 securely retains the transfer plate relative to the axial slider 442. Accordingly, forward or rearward movement of the axial registration slider 442 translates sleeve 346, which translates print cylinder shaft 344 and plate cylinder 350. Transfer plate 450 may be not affixed to sleeve 346 such that sleeve 346 (in some embodiments) may be free to move circumferentially with print cylinder shaft 344 during the circumferential registration system. Other structures, such as springs acting on print cylinder shaft 344 to urge the shaft 344 rearwardly against transfer plate 450, a mechanical connection between transfer plate 450 and sleeve 346 and/or print shaft 344, and the like, to enable movement of plate cylinder 350 in response to movement of axial registration slider 442 is contemplated.

In the embodiment illustrated in the figures, the circumferential registration mechanism 460 can include a mechanical connection between the circumferential registration slider 472 and hub 482, which includes bearings (not shown in the figures) between an inboard surface of hub 482 and plate cylinder shaft 344. Accordingly, print cylinder shaft 344 can rotate relative to hub 482, as a housing of hub 482 is attached to circumferential registration slider 472 by arm 480 (as best shown in FIG. 8) to prevent the housing of hub 482 from rotating.

The hub 482, in this regard, is constrained to have only axial movement relative to the plate cylinder shaft 344, while a rotating, interior portion of hub 482 is keyed to plate cylinder shaft 344 by a longitudinal key (not shown in the figures). Driven gear 316 is also keyed and fixed to the plate cylinder shaft 344 via a key in a longitudinal keyway in the interior hub bore. In some embodiments, the key attachments between gear 316 and plate cylinder shaft 344 may be such that gear 316 may be longitudinally slidable relative to shaft 344 by a dimension sufficient to enable the circumferential registration without resulting in axial movement of the shaft 344.

Accordingly, rotary motion of the circumferential registration drive gears 490*a* and 490*b* causes rotation of the circumferential lead screw 470, which moves circumferential slider 472 forward or rearward by interaction with nut 474. The forward or rearward movement of circumferential slider 472 is transmitted to the housing of hub 482 via the support arm 480. Hub 482 translates forward or rearward (depending on the direction of translation of slider 472) relative to print cylinder shaft 344—that is, while hub 482 translates, the plate cylinder shaft 344 and the plate cylinder 350 do not translate (that is, do not move axially). Translation of hub 482 translates gear 316 relative to shaft 344. As illustrated in the figures, gear 316 is helical such that the helical teeth of gear 316 are in meshed contact with the helical teeth of main drive gear 312. Gear 312 is effectively fixed, either by a mechanical brake, by an electrical brake on the main drive motor, and/or inertia or the like such that translation of driven gear 316 relative to main gear 312, which during the registration process is not rotating or rotatable, creates an angular displacement or rotation of driven gear 316. Because gear 316 is rotationally fixed via the key, the movement of circumferential registration slider 472 and axial displacement of the hub 482 causes a shift in timing between the gear 316 and drive gear 312, and in this way rotates the print cylinder 350 by a desired amount to achieve circumferential registration of print cylinder. Other configurations or mechanisms to achieve the shift in plate cylinder circumference in response to axial movement of the circumferential registration slide assembly are contemplated.

For some embodiments, productivity efficiency can be increased since print registration activity is possible and desirable during can decoration production. The registration system disclosed herein can improve the working environment and safety of machine operators, and the print registration (in some embodiments) can be achieved or realized by a single machine operator using the remote HMI placed in the region of the output from the beverage can printing machine.

According to another aspect of the registration system 400, a feedback system includes an axial registration proximity sensor 492 and a circumferential registration proximity sensor 494. Axial registration sensor 492 preferably is mounted on axial system slider 442, such as a front-facing portion of the slider 442. Circumferential system sensor 494 preferably is mounted on circumferential system slider 472, such as on a front-facing portion of the slider 472.

Sensors 492 and 494 may be of any suitable type that performs the feedback function described herein. Sensors 492 and 494 can be, without limitation, one or more inductive proximity sensors (such as eddy current or inductive type), micro switch contact, and linear encoder type registration position sensors that are preferably connected to the corresponding registration slider 442, 472, but may also or alternatively be connected to the plate cylinder shaft assembly. Thus, a rotary encoder type registration position sensors 496, if employed, may be connected to the axis common to the registration drive motors 432, 462 and/or and registration lead screws 440, 470, may be integral with the motor, and/or may be connected to the plate cylinder shaft assembly or other appropriate location.

The feedback system described herein can mitigate "lost" motion within the print registration mechanism giving high accuracy during print plate registration adjustment. Non-limiting examples of lost motion can include clearance or "play" in the bearings, motors, sliders, and/or lead screws, errors related to hysteresis of the system, other differences between input and expected output, and the like.

For an example of the operation of registration system 400, a user or an automated control system may initiate registration via the HMI or by other means based on information that includes a desired amount of axial adjustment and/or radial adjustment of the particular plate cylinder 350 to be registered.

Upon determining the magnitude of circumferential movement desired for the first one of the print cylinders 350, the motor of circumferential registration drive 462 is engaged to rotate circumferential registration lead screw 470 to translate circumferential registration slider 472 on support arms 40. The magnitude of circumferential translation may be measured or sensed by circumferential registration sensor 494 if mounted on circumferential registration slider 472, hub 482, or other translating portion of circumferential registration system 460 and/or by sensor 496 associated with circumferential registration motor 462, axial registration lead screw 470, or other rotating part of axial registration system 460. As explained above, axial displacement of slider 472 is converted into circumferential displacement of print cylinder 350.

Upon determining the magnitude of axial movement desired for a first one of the print cylinders 350, the motor of axial drive 422 is engaged to rotate axial lead screw 440 to translate axial registration slider 442 on support arms 40. The translation of slider 442 is transmitted to the plate cylinder shaft 344. The magnitude of the axial translation can be measured or sensed by axial registration sensor 492 based on translation of the axial registration slider 442 and/or sensor 496 associated with axial registration motor 422, axial registration lead screw 440, or other rotating part of axial registration system 420. If any axial movement of print cylinder 350 occurs during circumferential registration, based on sensor output, the desired magnitude of axial movement may be adjusted for correction. If any circumferential movement of print cylinder 350 occurs during axial registration, based on sensor output, the desired magnitude of circumferential movement may be adjusted for correction. Either axial or circumferential registration may occur first, or the registrations may be simultaneous, or in interrupted, alternating sequence.

When the desired magnitude of movement of the first plate cylinder 350 in its axial and circumferential orientation is achieved, the desired magnitude of axial and circumferential adjustment of the second plate cylinder 350 may be performed according to the above method. Conventional controls systems and techniques may be employed. As needed, each one of the plate cylinders 350 may be registered by its own registration system 410, 460 until desired image quality is achieved. The registration processes may be iterated as needed.

The description of the structure and function of the print registration system and the corresponding feedback system herein is provided as an example and illustration, as it reflects merely one embodiment. The present invention is not intended to be limited to the particular structure and function in the description (including the drawings) unless expressly set out in the claims. For merely some non-limiting examples, the present invention is not limited to a co-axial configuration of the shafts of the axial and circumferential registration systems, to any configuration of the drive registration gear train, any number of print cylinders of the decorator, to a particular control system or type of control system (if any), and the like.

Offset printing, as illustrated in the figures, relies on the transfer of ink between several different surfaces at each stage of the printing stage. The viscosity of the ink in inker assemblies 600 can affect the function of the equipment and the quality of the printing process. The temperature of the ink directly affects its viscosity. In some circumstances, ink temperatures may be higher or lower than preferred. Accordingly, according to an aspect of the invention, the temperature of the ink is controlled by one or more water cooled rollers as it is transferred through the inker assembly to the plate cylinder 350. The chosen temperature set point may be chosen to achieve a desired ink viscosity.

Figure 19:
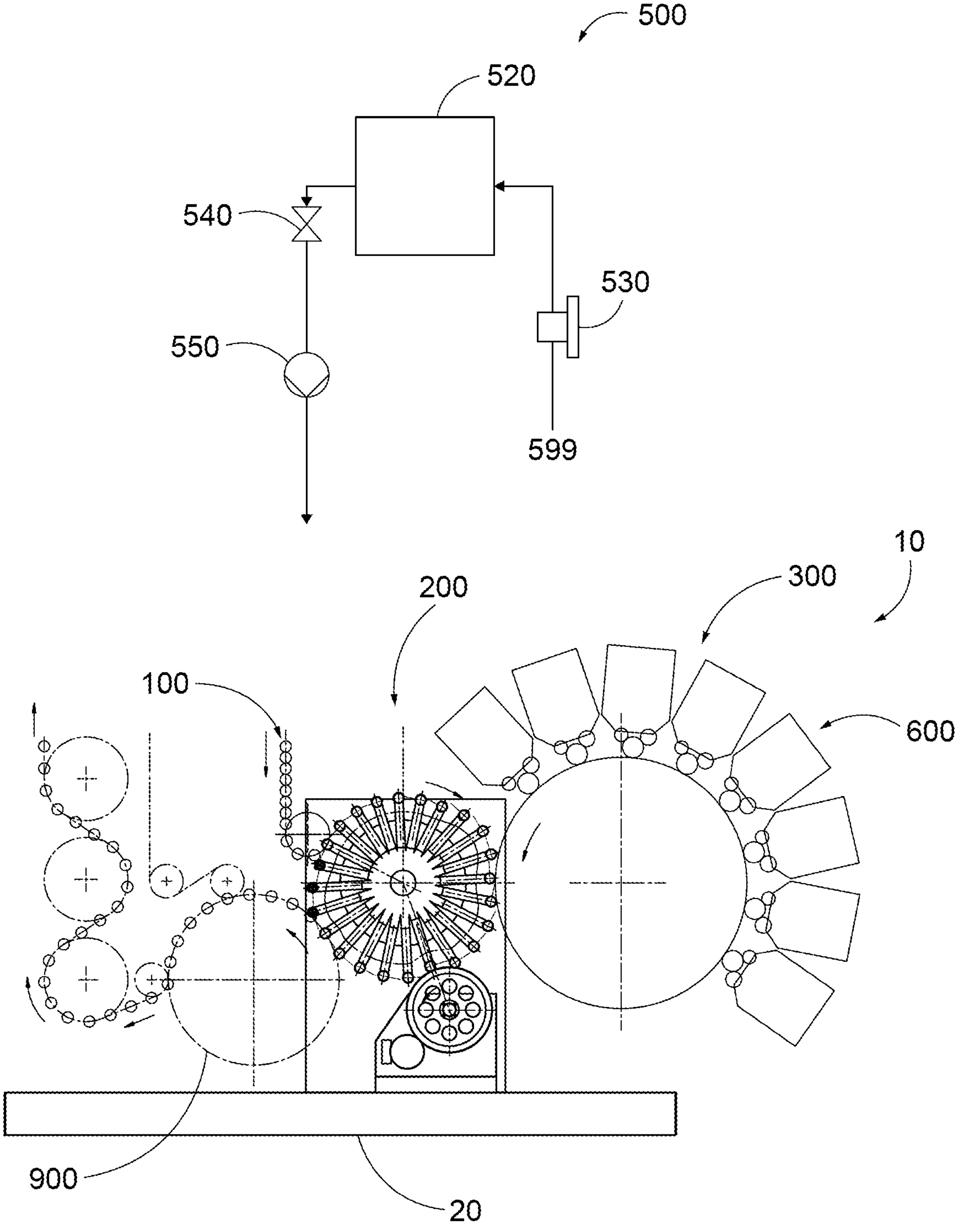
FIG. 19 is a perspective view of a lubrication coolant system.
Figure 20:
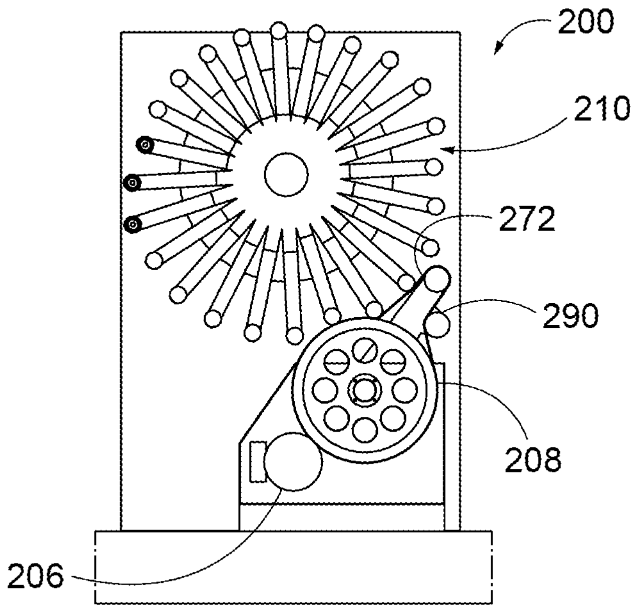
FIG. 20 is a schematic view of a can decoration assembly illustrating aspects of an—over-varnish assembly and mandrel pre-spin assembly.
Figure 21:
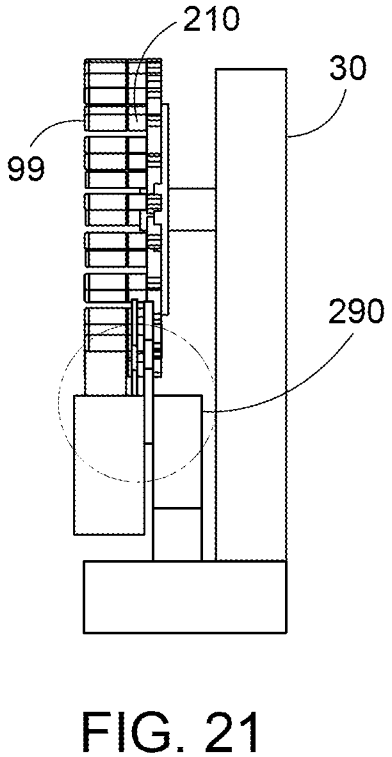
FIG. 21 is another schematic view of the structures in FIG. 20.
Figure 22:
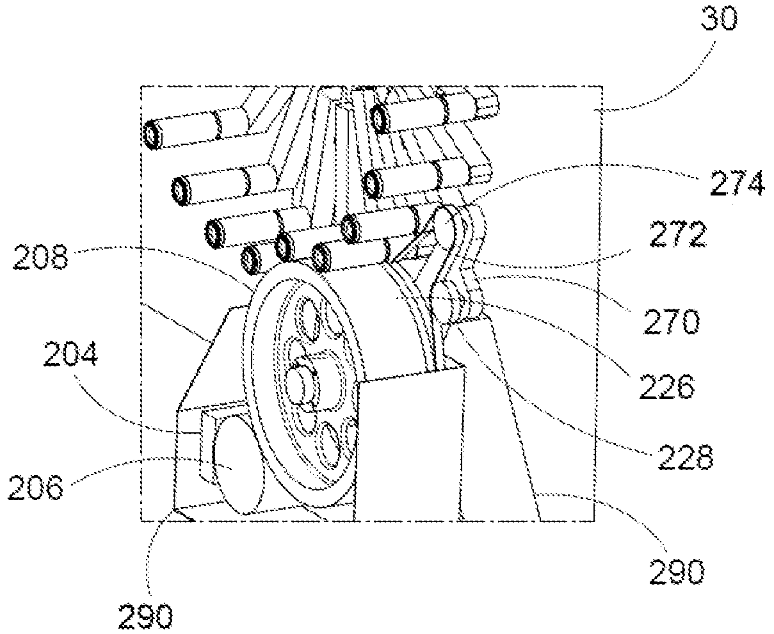
FIG. 22 is another schematic, perspective view of the structures in FIG. 20.
Figure 23:
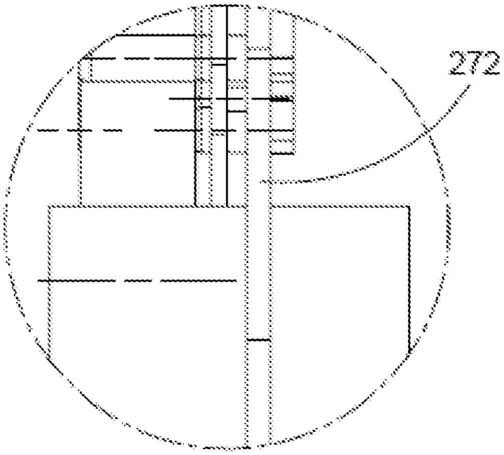
FIG. 23 is an enlarged view of a portion of FIG. 21.
Figure 24:
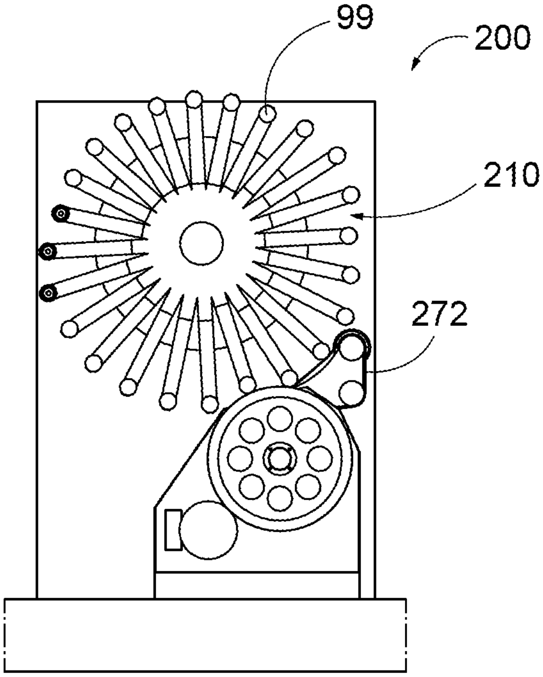
FIG. 24 is a schematic view of another embodiment of a can decoration assembly illustrating aspects of an -over-varnish assembly and mandrel pre-spin assembly.
Figure 25:
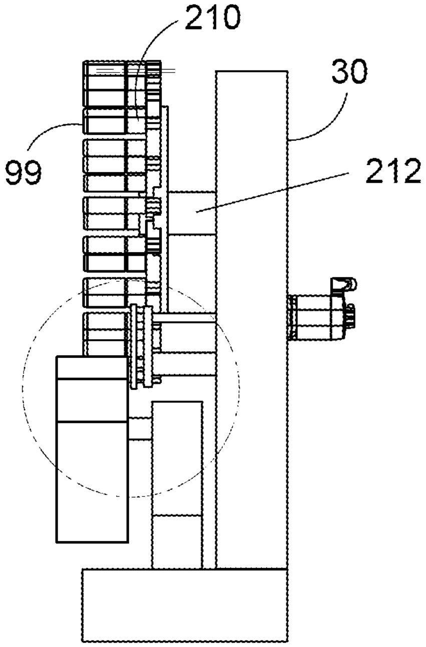
FIG. 25 is another view of the structure of FIG. 24.
Figure 26:
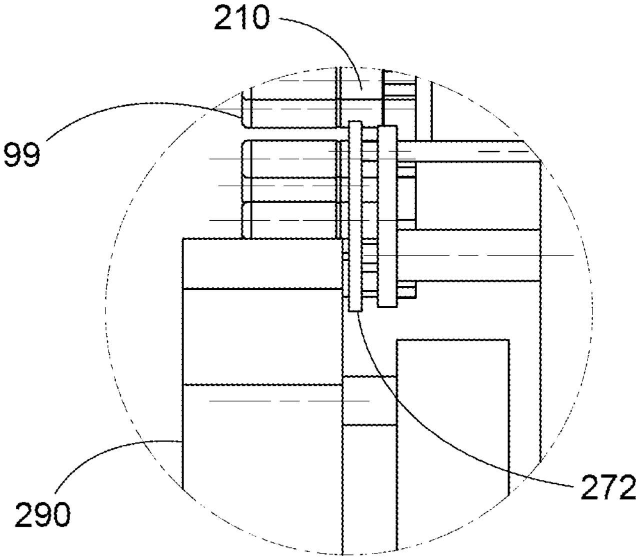
FIG. 26 is an enlarged view of a portion of FIG. 25.
Figure 27:
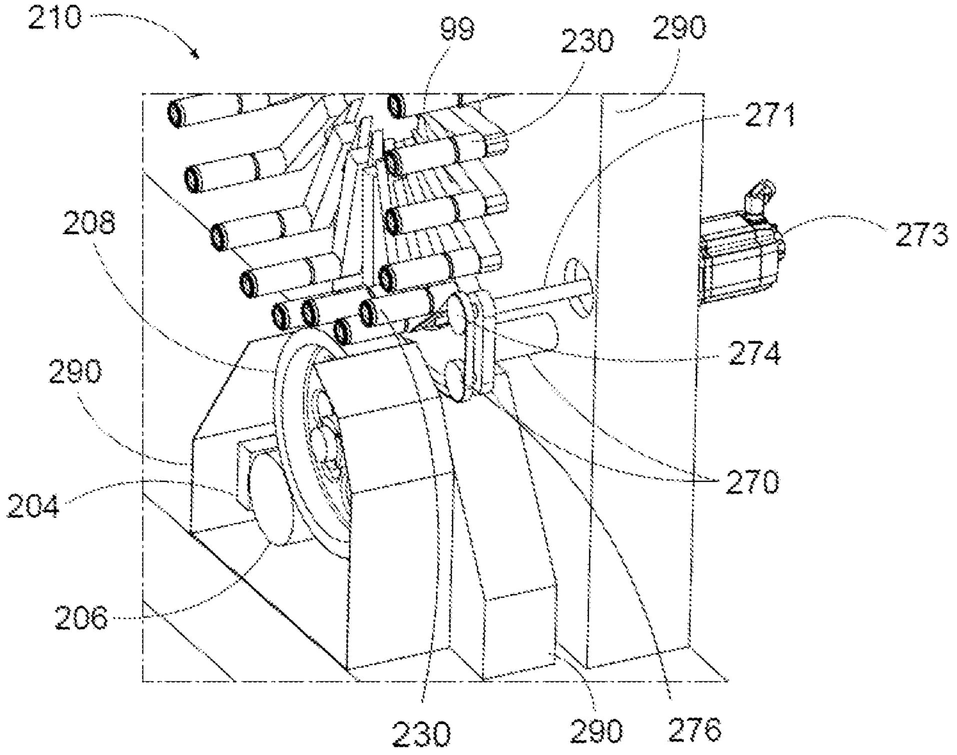
FIG. 27 is an enlarged view of a portion of the over-varnish unit and mandrel pre-spin assembly according to an embodiment.
Figure 28:
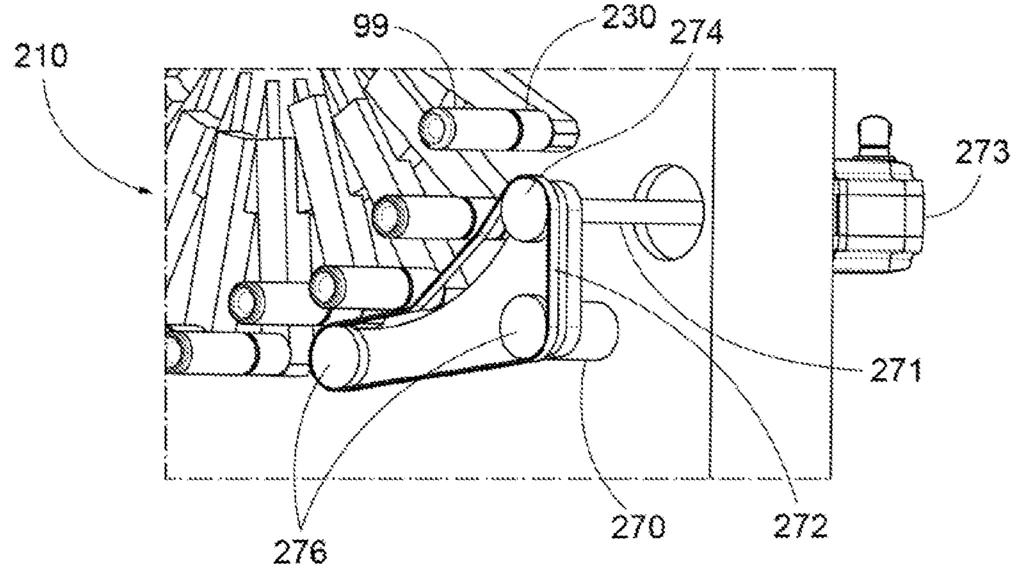
FIG. 28 is an enlarged view of a portion of the over-varnish unit and mandrel pre-spin assembly according to another embodiment.

Referring to FIG. 19, a printing ink temperature regulation system 500 includes a recirculating chiller 520; the rollers of the inker assembly 600; a temperature sensor, such as an inline temperature sensor 530 in the coolant flow at the outlet 599 of the inker assembly 600, a valve 540 for controlling the coolant flow, and a control system (not shown in the figures) that assesses the coolant outlet temperature and controls the position and movement of valve 540. The pump 550 may be of any type, as will be understood by persons familiar with conventional cooling systems in view of the present disclosure. The flow from 550 pump may be controlled by any means. In one embodiment, a variable speed drive (such as a Variable Frequency Drive (VFD)) is employed and configured to maintain approximately constant coolant pressure, regardless of the position of the valve 540. Other drives are contemplated.

The system 500 can be configured such that there is a temperature sensor 530 at the coolant outlet of each one of the inker assemblies 600, the coolant outlet flows can be combined (as, for example, via a manifold) such that a single (that is, only one) temperature sensor is located in the combined stream, or the coolant streams from two or more inker assemblies can be combined such that the coolant flow is separated into zones. Each zone, in addition to having its own temperature sensor, can have its own pump and/or valve.

Preferably, oscillating roller assemblies 610*u*, 610*a*, and 610*b*, described more fully below, receive coolant from chiller 520. For each assembly, coolant preferably flows through a center of each one of the oscillating roller shafts 612*u*, 612*a*, and 612*b*, and then counter-flows concentrically (either inside or outside the in-flow) through the same end of the roller assembly as the coolant inlet. Other configurations are contemplated.

Sensor 530 at the outlet 599 of the inker assembly 600 is on the inlet side of the chiller 520. Thus, the valve 540 can increase coolant flow rate if the coolant outlet temperature at temperature sensor 530 is higher than a predetermined set point or range, and can decrease coolant flow rate if the coolant outlet temperature is lower than the predetermined set point or range.

A controller to actuate the valve 540 based on the temperature sensor 530 and other conventional inputs and data can be of any type using any algorithm or method, such as a PID control (that is, proportional integral derivative control) or other control, as will be understood by persons familiar with industrial equipment controllers.

The chiller 520 may be a stand-alone chiller that supplies coolant only to the inker assembly 600, or may be a chiller or cooler that supplies coolant to other parts of the can decorating machinery or other plant equipment.

Each print cylinder 350 is supplied with a single color of ink by an inker assembly 600.

Accordingly, the number of inker assemblies 600 matches the number of print cylinder assemblies described herein.

Each inker assembly 600 for supplying ink to the plate cylinder 350 includes an ink well (also referred to as a fountain) 602 and a series of rollers mounted to a structural frame 604. Ink well 602 can be of any type. The rollers transfer and smooth, and to some extent meter, ink from the ink well 602 to the plate cylinder 350. Referring to FIGS. 11 through 16, within the inker assembly 600, to promote uniform ink application, an oscillation roller assembly 610 may move an ink roller axially back and forth, as described more fully below.

Figure 14:
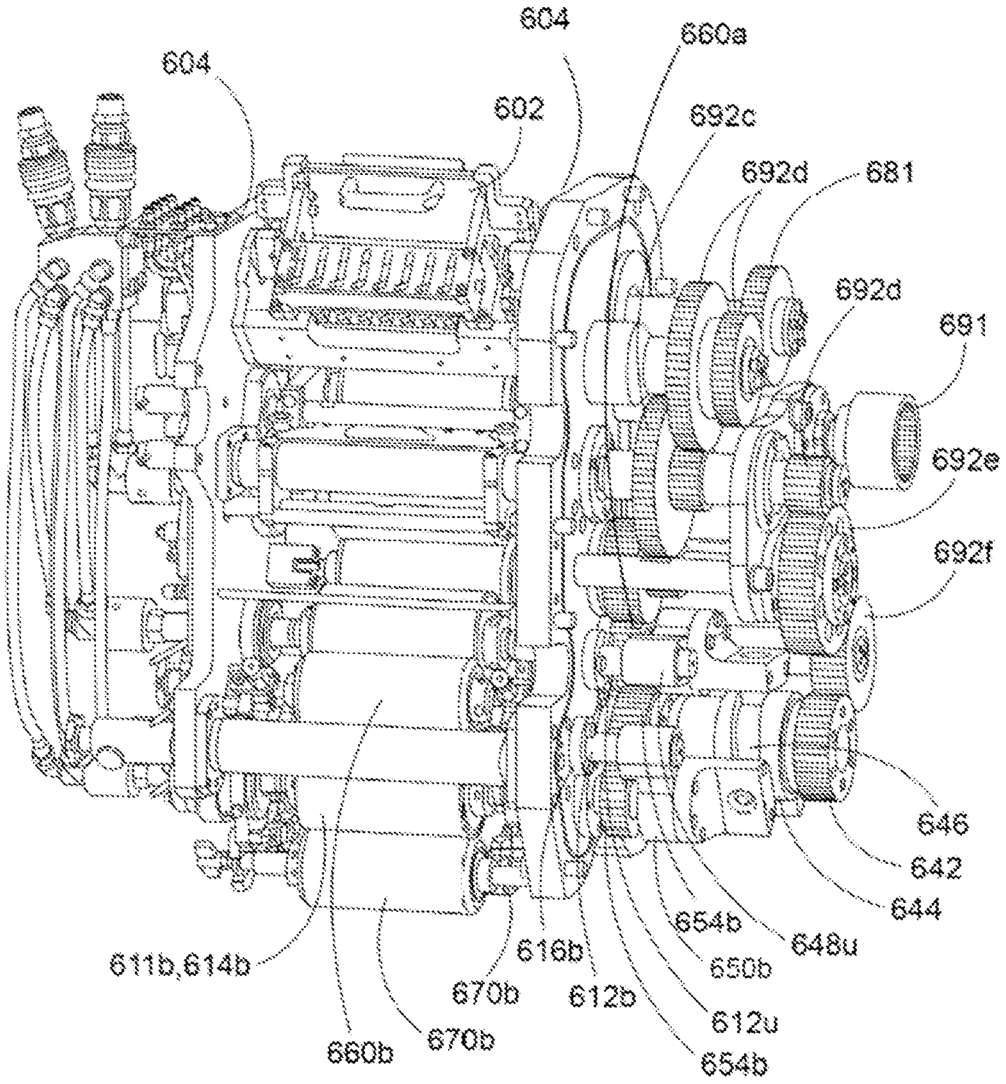
FIG. 14 is a perspective front view of the inker assembly.

Inker assembly 600, in the embodiment shown in the figures, includes an oscillating roller assembly 610 that includes a single oscillating roller drive assembly 640 and three oscillating roller assemblies 611*u*, 611*a*, and 611*b*. Inker assembly 600 also includes distributor roller assemblies 660*u*, 660*a*, and 660*b*, and form roller assemblies 670*a* and 670*b*. As illustrated in the figures, a preferred embodiment system has a single oscillating roller drive assembly 640 to achieve oscillation of all three oscillating roller assemblies 611*u*, 611*a*, which includes oscillating roller gears 6564*u*, 654*a*, and 654*b*, respectively. Gears 654*u* and 654 are hidden from view. FIG. 14 illustrates gear 654*b*.

Each oscillating roller assembly 611*u*, 611*a*, 611*b* includes an oscillating roller shaft 612, an oscillating roller body 614, a linear bearing 616, and a support bearing assembly 620. In some embodiments, bearing assembly 620 includes a lubrication supply gallery in which oil lubricant is supplied to the oscillator shaft support bearing 620 and recovered and managed through co-operation of a lubrication recovery housing 622 and the lubrication return gallery. Each bearing 616 and 620 is supported by frame 604.

Each distributor roller assembly 660*a* and 660*b* includes a distributor roller shaft 662*a* and 662*b*, a distributor roller body 664*a* and 664*b*, and a gear 666*a* and 666*b*, respectively. Each form roller assembly 670*a* and 670*b* includes a form roller shaft 672*a* and 672*b*, a form roller body 674*a* and 674*b*, and a gear 676*a* and 676*b*, respectively. Rollers 660 and 670 are supported by bearings that are supported by frame 604.

As is clear from the usage above, when there is more than one component, individual components (such as oscillating roller assemblies 611*u*, 611*a*, 611*b*) are identified by appending a letter a, b, or c. The components in general or as a group are referred to as reference number without an appended letter (such as by reference number 610 to refer to the oscillating roller assembly). This convention, referring to individual components by an appending a letter onto a reference number and using an un-appended reference number to refer to the components as a group or generally, may be used other places in this specification.

The inker assembly 600 can be separated into three zones: a drive zone 605, an ink zone 606, and operator zone 607. The drive zone 605 is outboard of the inker assembly frame 604, which preferably is an enclosure, on one side and the operator zone 607 is on the opposing side. The ink zone 606 is between the opposing plates of the frame 604 and includes the rollers.

Figure 11:
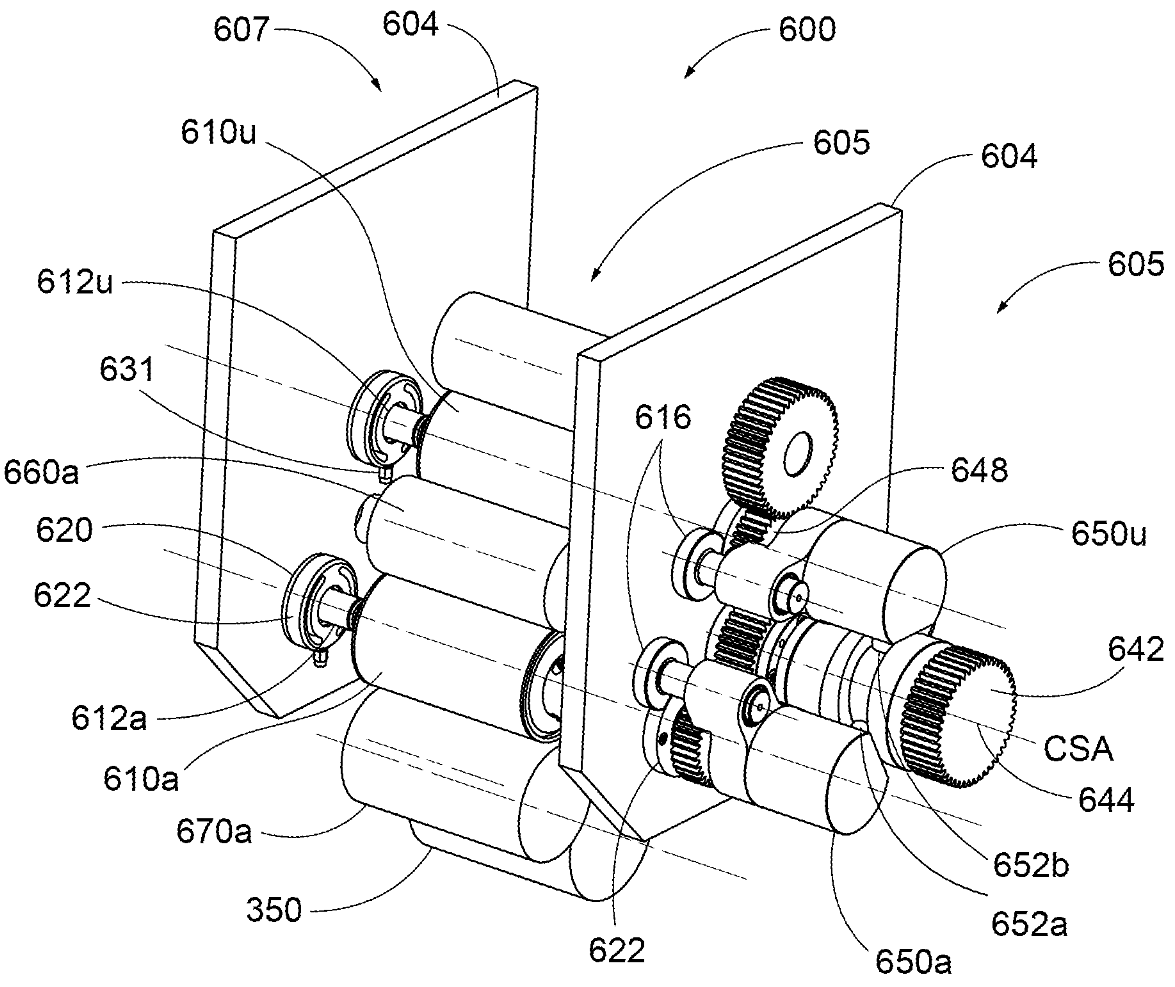
FIG. 11 is a perspective view of an inker assembly with portions removed for clarity.
Figure 12:
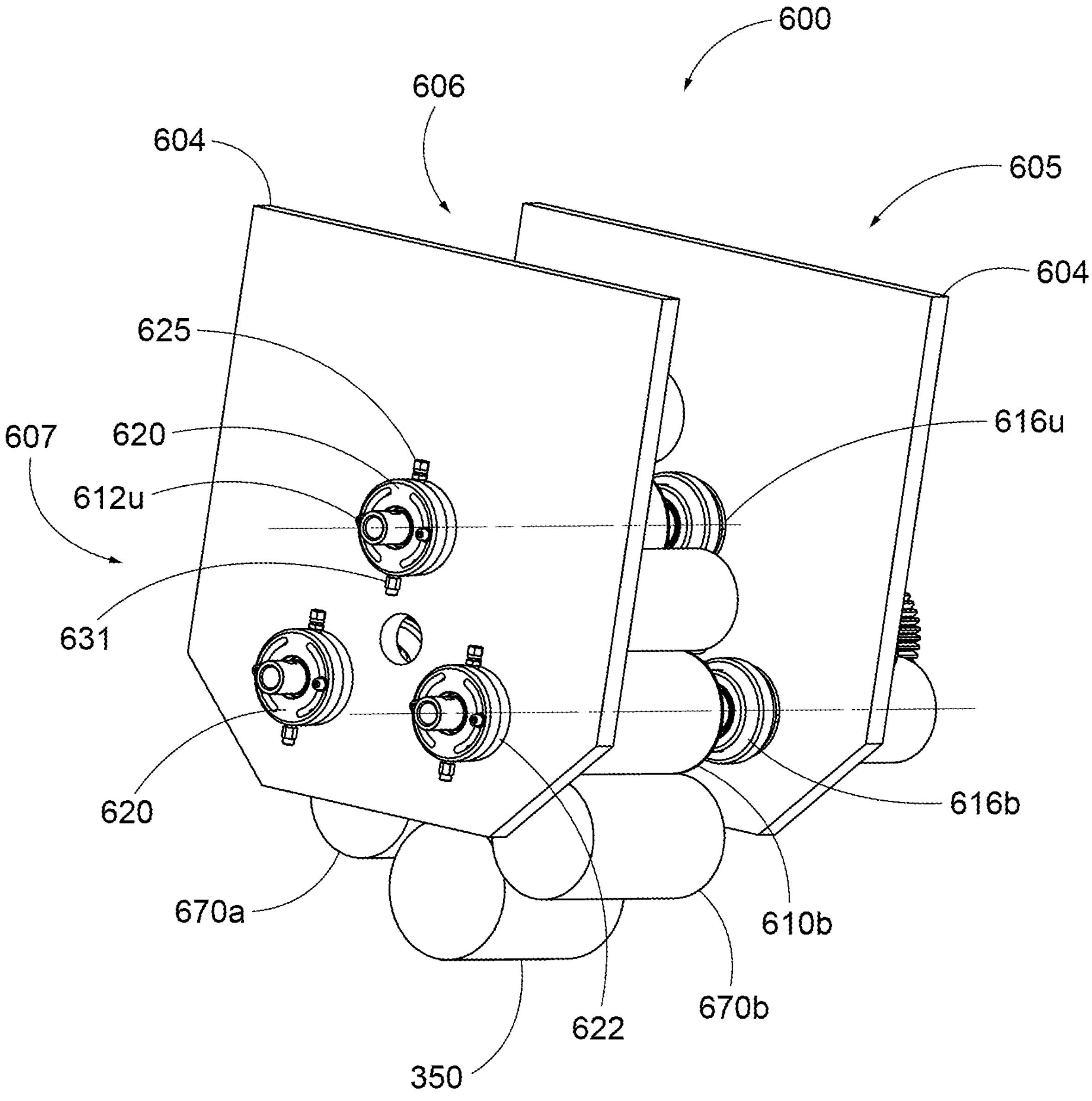
FIG. 12 is another perspective view of the inker assembly of FIG. 11.

As best illustrated in the FIGS. 11 and 12, the inker assembly 600 includes an upper oscillating roller 611*u*, left and right distributor rollers 660_a_ and 660_b_. The bodies 664_a_ and 664_b_ of left and right distributor rollers 660_a_ and 660_b_ are engaged with the roller body 614_u_ of upper oscillating roller 611_u_. The bodies 614_a_ and 614_b_ of left and right oscillating rollers 610_a_ and 610_b_ are engaged with the corresponding bodies of left and right distributor rollers 660_a_ and 660_b_. The bodies of left and right form rollers 670_a_ and 670_b_ are engaged with the corresponding bodies of left and right lower oscillating rollers 610_a_ and 610_b_, and each one of the form rollers 670_a_ and 670_b_ engages the plate cylinder 350.

Figure 13:
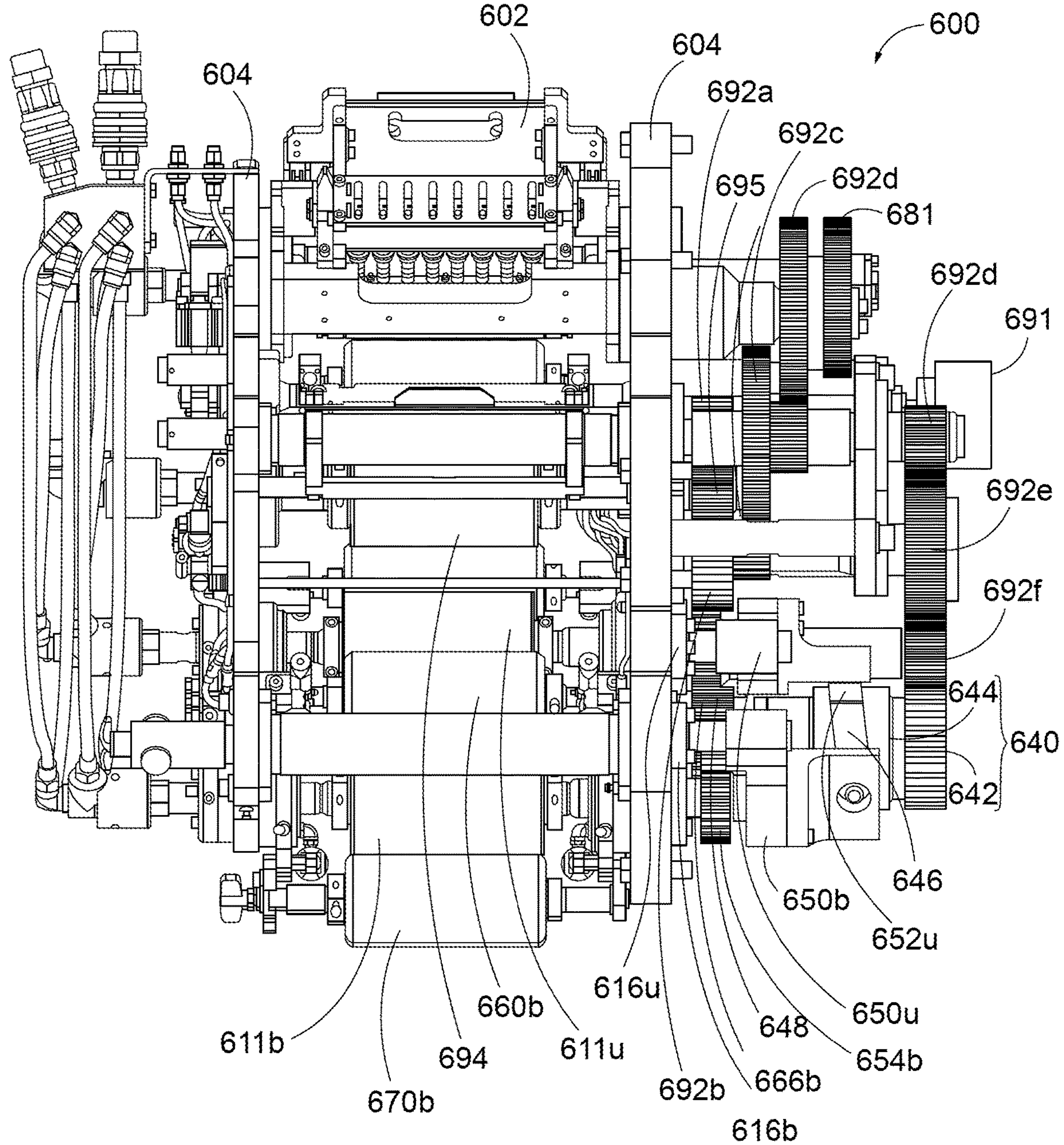
FIG. 13 is a front view of the inker assembly.
Figure 15:
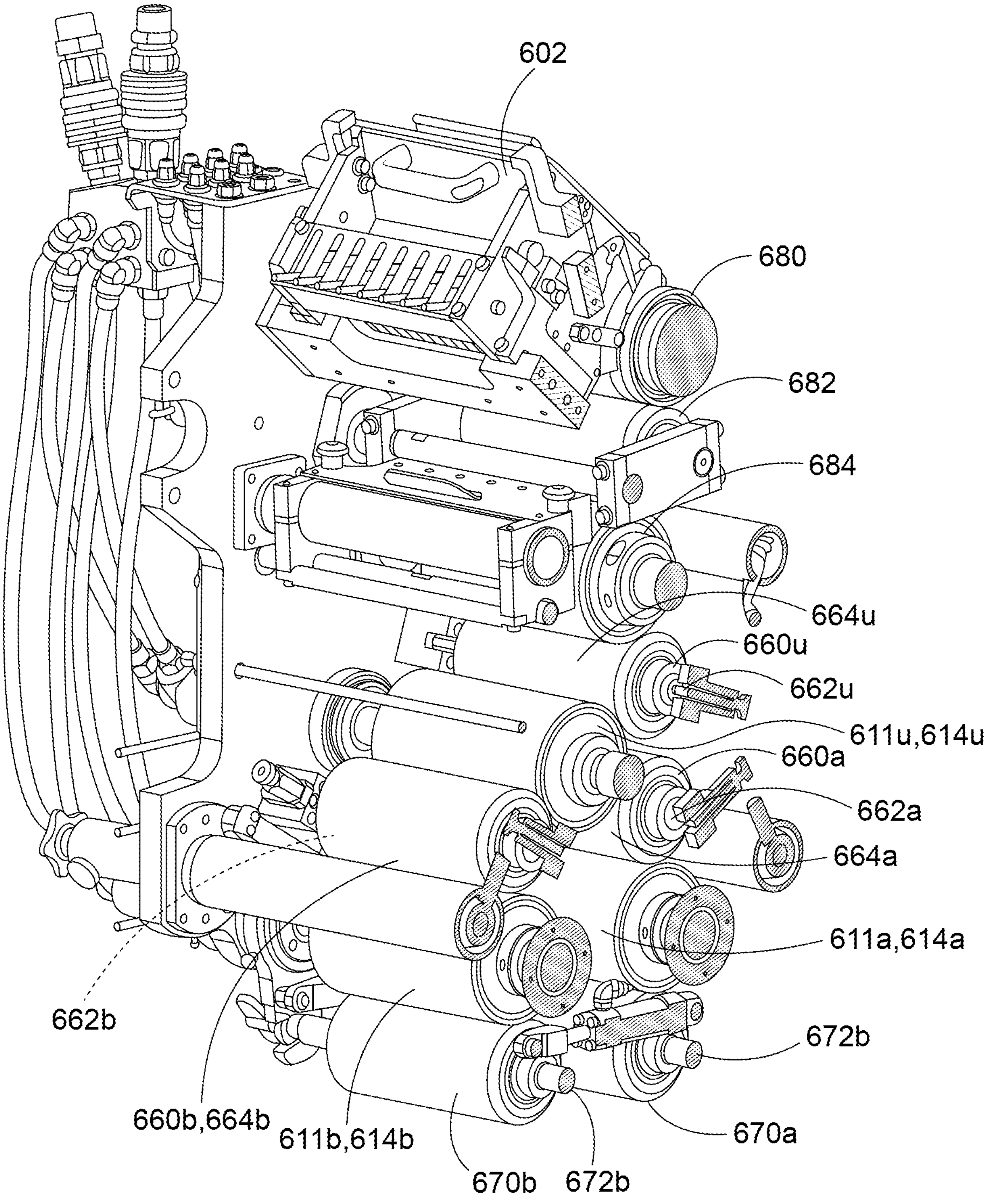
FIG. 15 is a perspective, cross sectional front view the inker assembly.

Referring to FIGS. 13 through 15, each inker assembly also includes a fountain roller 680 located at ink well 602, a ductor roller 682 adapted to engage the fountain roller 680, a transfer roller 684 adapted to engage the ductor roller 682, and an upper distributor roller 660_u_ adapted to engage transfer roller 684 and to engage upper oscillating roller 611_u_. Rollers 680, 682, and 684 may employ conventional inker roller technology. For convenience in the description, roller assemblies 660, 670, 682, 684, and 686 are referred to as "laterally-fixed roller assemblies" to distinguish them from the laterally oscillating roller assemblies 610. The laterally-fixed roller assemblies can be conventional, and do not require and need not have special structure to maintain their lateral positions. Rather, the term "laterally fixed" is used merely to refer to conventional rollers that do not have a system to create lateral or oscillating motion of the roller for distributing ink.

In the embodiment shown in the figures, the oscillating roller assembly 610 includes a single oscillator drive assembly 640 that includes (preferably) a single cam drive gear 642 mounted on a cam body 644. A cam 646 is formed in cam body 644 and preferably is a rise-and-fall or undulating continuous recess or groove about the circumference of cam body 644. A cam gear or idler gear 648 is also mounted to cam body 644. Cam body 644, cam 646, and idler gear 648 are mounted to a cam shaft (mounted to frame 604) and constrained such that cam body 644, cam 646, and idler gear 648 rotate about a cam shaft center axis, identified as line CSA in FIG. 11, as each one of elements 644, 646, and 648 are coincident or share the same centerlines.

The oscillator drive assembly 640 can be considered to include three cam follower supports 650_u_, 650_a_, 650_b_ and three corresponding cam followers 652_u_, 652_a_, 652_b_, each of which is affixed or unitary with the corresponding cam follower support. Each cam follower 652_u_, 652_a_, 652_b_ and associated cam follower support 650_u_, 650_a_, 650_b_ are mounted on the corresponding oscillating roller shaft 612_u_, 612_a_, 612_b_ and co-operate directly with the cam groove 646. The cam follower supports are configurated to transmit "rise-and-fall" or "back-and-forth" translation to the corresponding oscillating roller body 614_u_, 614_a_, and 614_b_. Linear bearings 616_u_, 616_a_, 616_b_ co-operate with the frame 604 to constrain the corresponding cam follower support 650_u_, 650_a_, 650_b_ to linear motion.

As illustrated in the figures, three multiple oscillating roller assemblies 611_u_, 611_a_, 611_b_ are arranged about the single oscillator cam body 644. The oscillating roller assemblies 611_u_, 611_a_, 611_b_ can be arranged equally spaced about a pitch circle diameter where the center point of the pitch circle diameter is coincident with the axis of a single oscillator cam body 644 and such that upper oscillating roller assembly 611_u_ is the top center (that is, at the 12 o'clock relative to the centerline of cam body 644), and roller assemblies 611_a_ and 611_b_ are spaced 120 degrees from upper roller assemblies 611_u_ and from each other. Other configurations are contemplated Referring to FIGS. 13 through 15, each inker drive assembly includes a coupling 691 for receiving power from a motor (not shown) or through gearing connected to another power source (not shown). A first idler gear 692_a_ is mounted on a common shaft with coupling 691. First idler gear 692_a_ is engaged (that is, in mesh contact so as to be capable of transmitting torque) with a drive gear 695 that is mounted on the shaft of transfer roller 694. Transfer roller drive gear 695 is engaged with a second idler gear 692_b_, which at a lower level is engaged with a third idler gear 692_c_, which is engaged with fourth idler gear 692_d_, which is engage with fountain roller drive gear 681.

The shaft on which third idler gear 692_c_ is mounted has another gear, fourth idler gear 692_d_, mounted on an end thereof that is distal from third idler gear 692_c_. Fourth idler gear 692_d_ engages a fifth transfer gear 692_e_, which engages a sixth transfer gear 692_f_, which engages the cam drive gear 642.

The gears described herein for the inker system 600 may be conventional, such as conventional spur gears. The figures illustrate gear ratios, tandem gears (that is, two or more gears on one shaft), and other details of the gear train. Further, the gear ratio and gear designs may be chosen according to the desired parameters of the inking system. And other means for transmitting torque are possible. In this regard, the term "transmission" is used to refer to any means for transmitting torque, such as a gear train, belt and pulley system, sprocket assembly, and the like.

The present invention is not limited to any gearing configuration or even to gears at all, as (as explained above) alternatively, the gear system could be a pulley and belt system, or sprocket and chain system to achieve the functions as needed. Persons familiar with inker system structure and function will understand the design parameters to achieve the desired system function. Thus, the inker gear train illustrated and described herein is provided merely for convenience of illustration and is not intended to limit the scope of any invention disclosed herein unless expressly claimed.

Preferably each one of the support bearings 620_u_, 620_a_, and 620_b_ of the oscillating roller assemblies 610 include a lubrication system that includes a housing 622, a supply system 624 that feeds lubricant into an inlet plenum 626 formed in the housing 622, a return system 628 for enabling discharge of lubricant from an outlet plenum 630.

Figure 16:
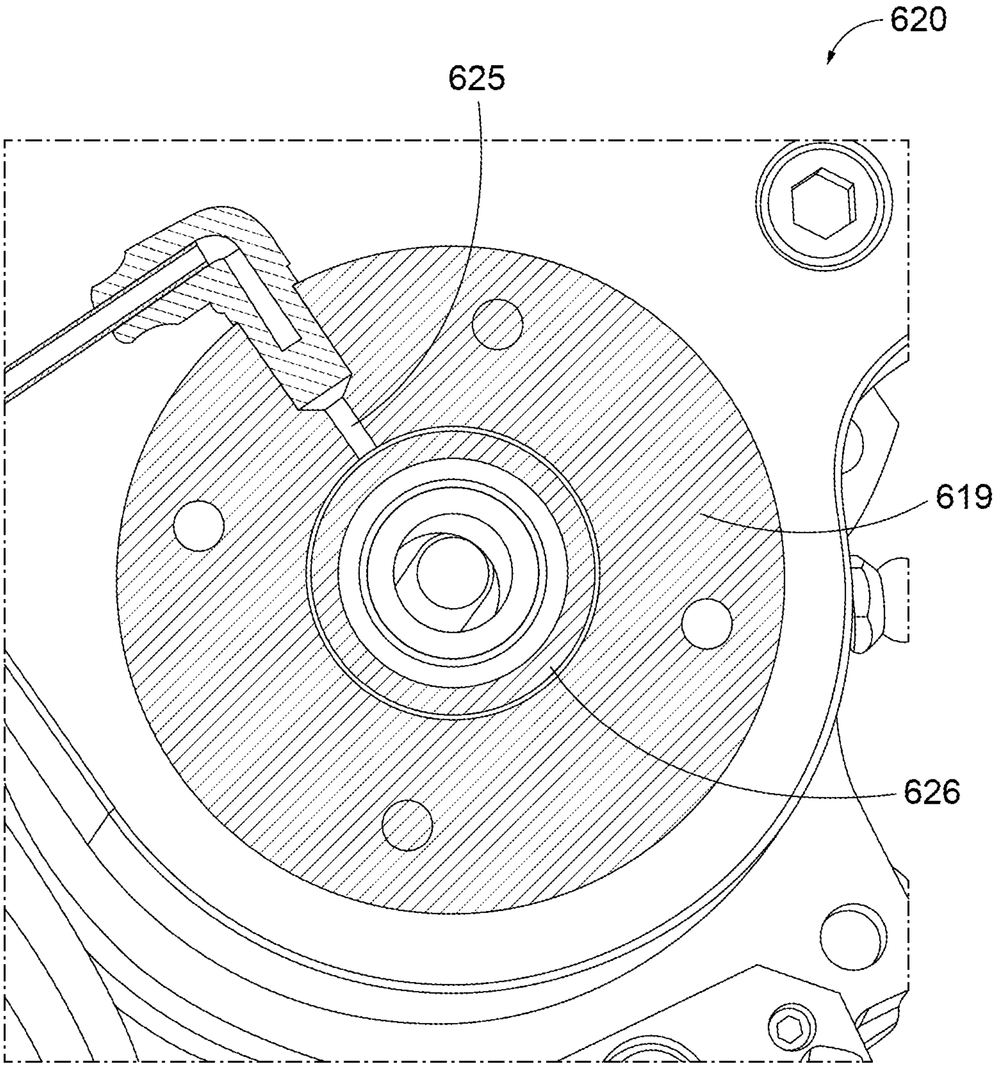
FIG. 16 is an enlarged view of an oscillating support bearing assembly, showing the bearing housing in cross-section.
Figure 17:
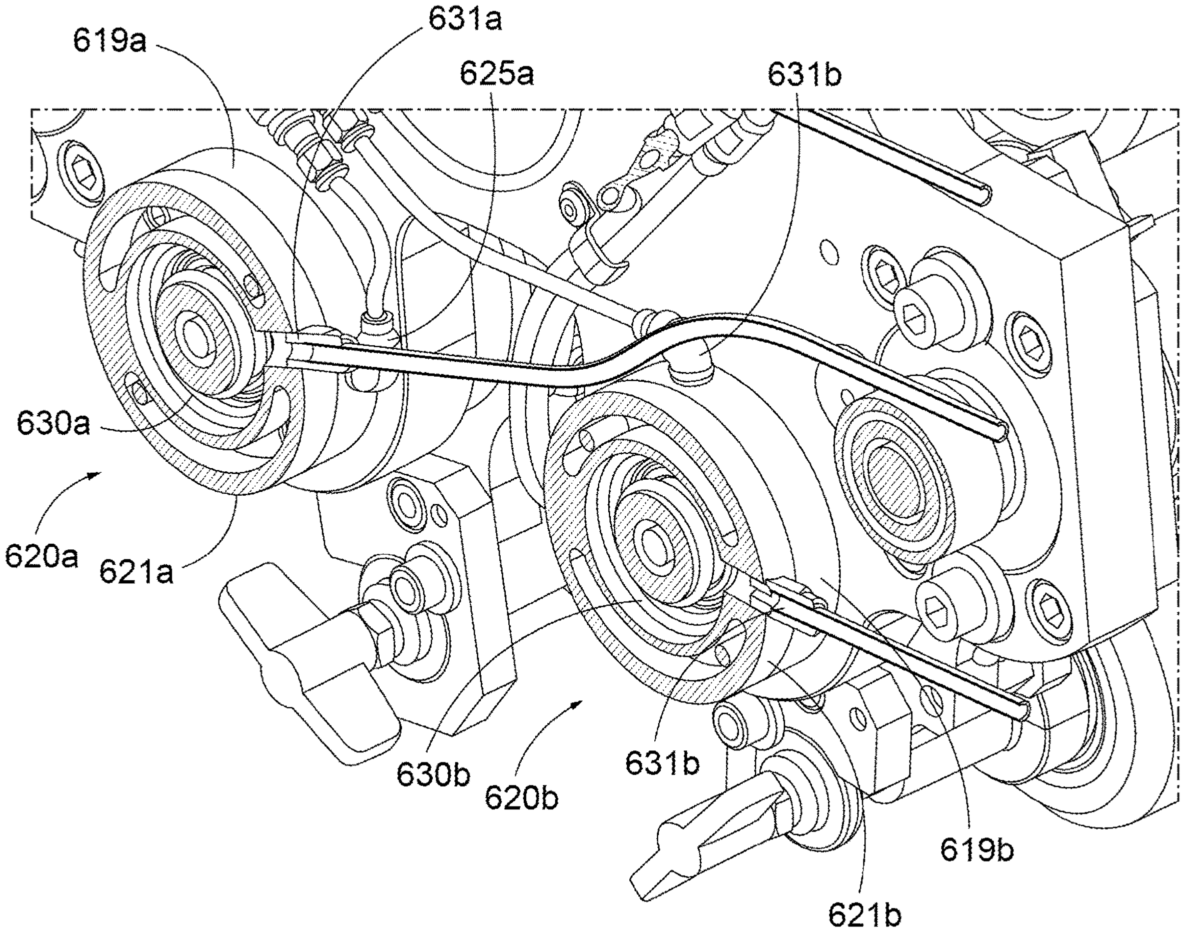
FIG. 17 is another enlarged view of the oscillating support bearing assembly, showing the bearing housing of FIG. 16 in cross-section, taken at a shallower level than shown in FIG. 16.
Figure 18:
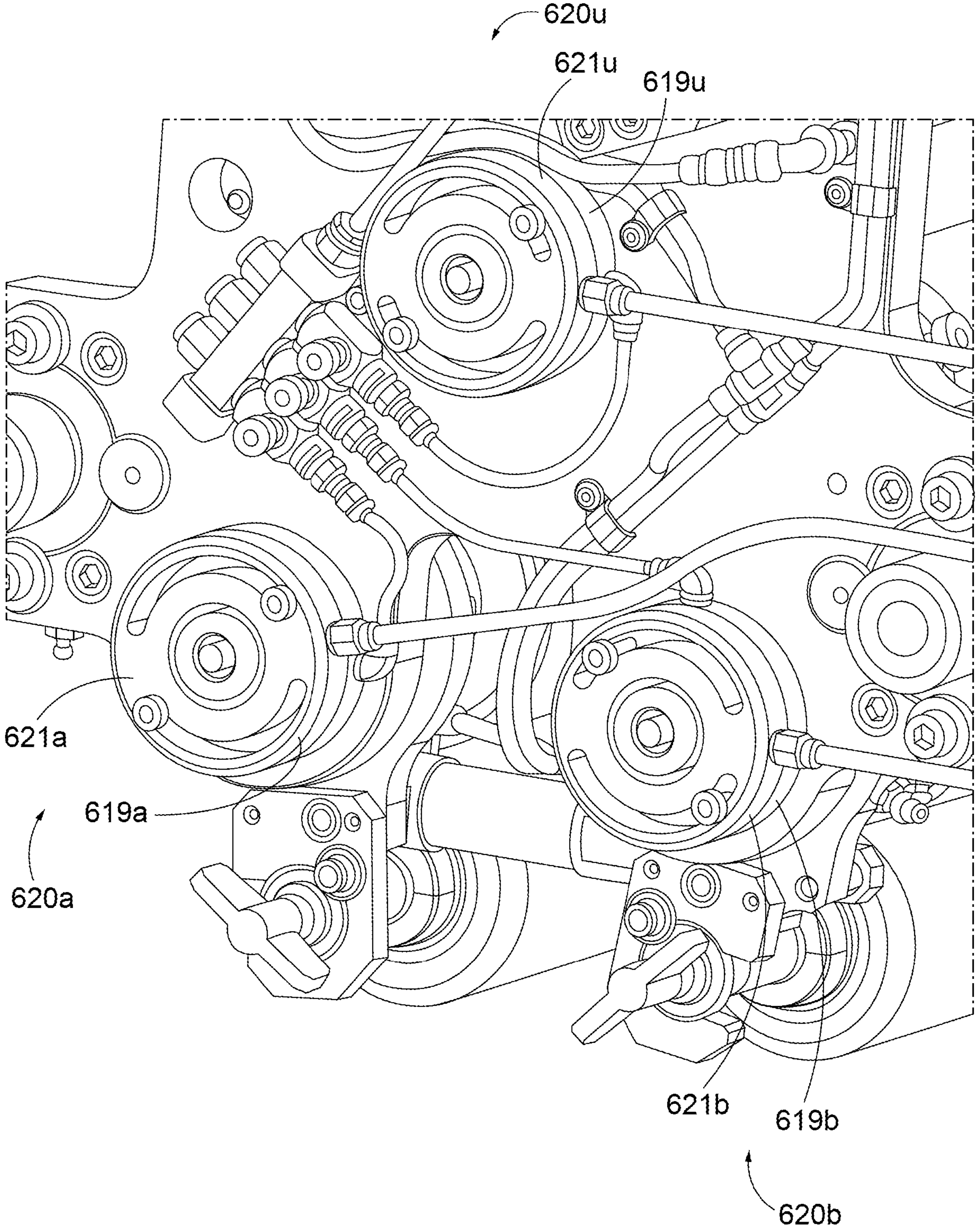
FIG. 18 is an enlarged perspective view of the oscillating roller assemblies.

FIGS. 16 through 18 show an enlarged view of the preferred embodiments of the support bearings 620_u_, 620_a_, and 620_b_. As illustrated in the figures, each one of the support bearings 620_u_, 620_a_, and 620_b_ includes a two-part housing 622 (that is, 622_u_, 622_a_, and 622_b_) that forms an inlet plenum and an outlet plenum for holding lubricant and for enabling the lubricant to flow through the corresponding housing 622_u_, 622_a_, and 622_b_ to lubricate bearing 632 (that is, bearing 632_u_, 632_a_, and 632_b_) therein. The two-part lubricant recovery housing 622_u_, 622_a_, and 622_b_ includes a base 619 (that is, 616_u_, 619_a_, and 619_b_) and a cap 621 (that is, as illustrated 621_a_, 621_b_, and 621_b_).

For each bearing 620, an inlet 625 (illustrated in FIG. 16) connects a lubricant supply system to inlet plenum 626 and an outlet 631 (illustrated in FIG. 17 as outlets 631_a_ and 631_b_) connects a lubricant return system to outlet plenum 630. The particular configuration of the plenums 626 and 630 may be chosen according to the desired bearing type, size, rating, and other known parameters.

In the embodiment of the figures, each bearing base 622_u_, 622_a_, and 622_b_ is affixed to frame 604. The bearing cap 622_u_, 622_a_, and 622_b_ includes slots for enabling angular positioning of the cap such that the circumferential position of corresponding outlet 631*u,* 631*a,* and 631*b* relative to a horizontal datum can be chosen and/or adjusted as needed. In some embodiments, the circumferential position of the outlet 631 will determine a depth of lubricant in the plenums 626 and 630. Optionally, the position of the inlet 625 may also be circumferentially adjustable. The term "supply gallery" is used herein to refer to inlet 625 for receiving lubricant and inlet plenum 626. The term "return plenum" is used herein to refer to outlet 631 and outlet plenum 630. The particular structure and function of the supply gallery and return gallery illustrated are not intended to be limiting, but rather encompass other structures according to the plain meaning of the structural terms, and as set out in the claims.

The lubrication system can be a closed loop system that can include a pump, filter, cooler, instrumentation and controls, and other conventional oil conditioning equipment. The lubrication system components may be chosen according to design parameters well known in the art and depending on the particular configuration of the bearings 620 and other components of the oscillating roller assemblies 610. Thus, lubricant is supplied to the oscillator shaft support bearings 620 through co-operation of the lubricant supply gallery and bearing housing. Lubricant supplied to the oscillator shaft support bearing is recovered and managed through co-operation of lubrication recovery housing and the lubrication return gallery. The lubricant is preferably an oil.

To illustrate the function of the structure of inker system 600 and to describe a method of operating an inker assembly, torque is supplied to the gear train by connection of a rotating shaft to coupling 691, which transmits torque through the drive train to rotate fountain roller drive gear 681 and to rotate cam drive gear 642. Optionally, third idler gear 692*c* may engage upper oscillating roller drive gear 654*u*.

As cam body 644 rotates about its longitudinal axis from torque applied via the cam drive gear 642, the cam followers 652*u,* 652*a,* and 652*b* on each one of the oscillating roller assemblies 610*u,* 610*a,* and 610*b* engages the rotating cam 646.

Referring to only one of the three oscillating roller assembly systems for illustration, as the description of the other rollers will be the same, the undulating path of the cam 646 causes the oscillating translation (fore and aft or back and forth) of the cam follower 652*u,* which motion is transmitted to the cam follower support 652*u,* which motion is in turn transmitted to the roller shaft and roller 612*u.* In this regard, oscillator shaft support bearing 620*u* and linear bearing 616*u* are fixed to the bearing housing 604 such that oscillating roller shaft 612*u* is supported and constrained by the oscillator shaft support bearings. The oscillating roller shaft 612*u* rotates and translates about its own axis to spread and even out the ink as it interacts with rollers above and below it to deliver to the plate cylinder. Oscillating roller assemblies 610*a* and 610*b* operate as describe for assembly 610*u.*

Other rollers, such as fountain roller 680, ductor roller 682, and transfer roller 684 can rotate independently from the linear motion of the oscillating rollers, either driven directly from the gear train of through contact with other rollers.

The inker configuration described herein has some advantages over prior art systems.

The present invention is not limited to structures of functions embodying or including the advantages, unless expressly set out in the claims, nor are the advantages listed herein intended to distinguish the inventive structure or function. Rather, the advantages are merely for illustrations. The structure shown in the figures engages three oscillating roller systems, as prior art, pivoting lever-type configurations are often effectively limited to cooperation with no more than two oscillator shafts. Prior art cams and cam followers typically provided higher inertia, and the magnitude of the reaction force sum in configurations in which the cam is mounted directly on the oscillating roller shaft. The structure in the figures diminishes the magnitude of inertia compared with prior art oscillating roller structures. And dynamic loading on the cam and cam follower are reduced. Symmetric arrangement of multiple oscillating roller assemblies about a single cam combined with the "rise-fall-rise" cam profile sums complementary reaction forces to zero thereby eliminating a source of vibration and extending component life. And total loss lubrication systems can contaminate the ink zone and the operator zone. Current commercially available beverage can printing machinery rely on periodic operator intervention to manually wipe clean the total loss lubricant, which operator intervention is eliminated or diminished in the embodiment of the figures.

In many prior art machines, beverage can bodies exit the print region and enter the over-varnish unit on mandrels that are stationary (that is, not rotating about the longitudinal axis of the mandrel), or that have reduced rotational speed (compared with the rotations speed immediately after engaging the print blankets) due to friction. As used herein, the term "pre-spin" refers to imparting rotation to the beverage can body 99 about its longitudinal axis after dis-engaging with the print blanket 330 of the blanket drum assembly. For decorators without pre-spin of the mandrels before the over-varnish unit, rotation of the mandrel occurs instantaneously with contact between a mandrel drive tire and the mandrel, which is simultaneous with contact between the can body and over-varnish applicator roller. Thus, without pre-spin, accuracy of "can wraps" may be lost due to skidding between can body and over-varnish applicator roller.

Referring to prior art FIGS. 31-34, a prior art over-varnish unit 1200 includes and over-varnish fountain well 1204 that supplies a coating to a gravure roller 1206 that supplies the coating an applicator roller 1208, that in turn applies the coating to the can bodies 99 on mandrels 230. The mandrel wheel 1210 is driven by a mandrel drive tire 1214 that is driven by a drive belt (not shown in the figures). The belt, applicator roller 1208, and drive tire 1214 are within an varnish unit enclosure 1290.

Varnish mist created by the over-varnish process and condensate from the mist can build up on the components, including the mandrel drive tire, which can transport varnish from within the over-varnish enclosure 1290 into the general environment of the beverage can decorating machine print section. The contamination by varnish of the general machine environment leads to uneconomic consumption of varnish, loss of production for clean-up schedules, & possible quality issues.

Referring to the embodiment of illustrated in FIG. 20-30, over-varnish unit 700 of decorator 10 includes and over-varnish fountain well 204 that supplies a coating to a gravure roller 206 that in turn supplies the coating to an applicator roller 208, that in turn applies the coating to the can bodies 99 on mandrels 230.

The mandrel wheel 210 and over-varnish unit 700 configuration provides independent support for a mandrel pre-spin system 270, as it can be (optionally) supported by the machine frame 30. In this embodiment, the over-varnish assembly 700 can be removed (such as for maintenance or repair) while the over-varnish pre-spin assembly 270 remains mounted on the beverage can decorator machine. Support of the pre-spin assembly 270 independent from the support of the over-varnish unit also enables a mandrel drive belt 224 to be exchanged without removing the over-varnish applicator roller 208. Other embodiments protect some of the mandrel drive belt components from varnish mist and condensate.

Mandrel pre-spin drive 270 includes a motor (not shown in the figures), a motor shaft 271, a drive pulley 274 mounted on shaft 271, idler pulleys 276, and a mandrel drive belt 272. The mandrel drive belt 272 extends between the pulleys 274 and 276 and contacts mandrels 280. In this regard, can bodies 99 after contact with blanket pads 330 are engaged by mandrel drive belt 272 just before the can bodies 99 engage the applicator roller 208 to impart rotation of the mandrel 280 on which the can body is loaded. This "pre-spin" of the mandrel and can body improves the engagement of the can body 99 with a surface 226 of the applicator roller 208.

As illustrated in FIG. 29 the pre-spin drive assembly 270 can be supported by the machine frame 30 (or supported by a separate, independent frame, not shown in the figures). The mandrel drive belt 272 and drive pulley 274 and idler pulleys 276 all outside of the over-varnish unit enclosure 290. In the embodiment of the figures, belt 272 extends behind the applicator roller 208 and the rear wall of its enclosure 290. Thus, the belt pulleys 274 and 276 and belt 272 are spaced apart from and at least partially, and preferably wholly, protected from varnish mist and by the over-varnish unit enclosure. The term "belt" as used herein relating to the pre-spin belt can encompasses other means, such a chain, gears, and the like.

Advantages to the pre-spin configuration shown and described herein also includes that the accuracy of "can wraps" is improved by the pre-spin because friction characteristics between the mandrel and mandrel drive belt are consistent. And mandrel rotational pre-spin speeds are independent of other drives in the beverage can decorating machine in embodiments in which the mandrel drive belt has its own motor.

After the can bodies 99 have been coated in the over-varnish unit 700, the can bodies are transferred to a rotating can transfer assembly 902 and to a pin chain conveyor 904. In the embodiment of the figures, can bodies 99 exit from mandrel wheel 210 before the trip reset point E, but other configurations and sequences are contemplated. An mandrel brake (not shown) may stop the spinning of mandrel 230 before being in a position to receive a can body at point A.

The structure and function of features of a can decorator are disclosed and explained herein to illustrate inventive aspects of the decorator and its components. Further, several advantages of structures and functions are explained above. As partially explained above, the invention is not limited to any particular structure and/or function of the embodiments disclosed herein, nor is invention limited to any structure or functions having any of the advantages described herein. Rather, the structure and function and advantages in the text and drawings are merely to illustrate, and is not intended to limit the scope of the inventions. It is intended that the claims be given their fair and broad scope.

We claim:

1. A combination over-varnish unit and pre-spin assembly for a can body decorating machine, the pre-spin assembly being located at an inlet to an over-varnish unit, the over-varnish unit including:
- a support frame; and
- a rotatable applicator roller for applying a coating to can bodies after decoration has been applied to the can bodies by a blanket wheel;
- the pre-spin assembly comprising:
- a pre-spin drive assembly that is independent from a drive of the over-varnish unit and is supported independent from the support frame of the over-varnish unit; and
- a mandrel drive belt driven by the pre-spin drive assembly, the mandrel drive belt configured to contact mandrels for imparting spin to the mandrels before the mandrels are positioned for contact with an applicator roller of the over-varnish unit.

2. The combination of claim 1 wherein the pre-spin drive assembly includes a pre-spin drive motor, a pre-spin drive shaft, a mandrel drive belt pulley, and mandrel idler pulleys, and wherein the mandrel drive belt pulley and the idler pulleys engage the mandrel drive belt.

3. The combination of claim 2 further comprising an over-varnish unit enclosure that houses the applicator roller, the mandrel drive belt is at least partially outside the over-varnish unit enclosure.

4. The combination of claim 3 wherein the pre-spin drive motor is controlled independently from a main decorator drive and/or independently the drive of the over-varnish unit.

5. The combination of claim 3 wherein the mandrel drive belt pulley, the idler pulleys, and the mandrel drive belt are mounted on a pre-spin drive motor shaft on a front side of the support frame, and the pre-spin drive motor is mounted to a backside of the support frame and the pre-spin drive shaft extends through the support frame.

6. The combination of claim 2 wherein the pre-spin drive assembly includes an over-varnish belt drive pulley that drives the applicator roller of the over-varnish unit.

7. The combination of claim 1 wherein the pre-spin drive assembly is supported from a support structure of a mandrel wheel of the can body decorating machine.

8. A combination over-varnish unit and pre-spin assembly for a can body decorating machine, the pre-spin assembly being located at the inlet to an over-varnish unit, the over-varnish unit including:
- a support frame; and
- a rotatable applicator roller for applying a coating to can bodies after decoration has been applied to the can bodies by a blanket wheel;
- the pre-spin assembly comprising: a pre-spin drive assembly including a pre-spin drive motor, a pre-spin drive shaft, a mandrel drive belt pulley, and mandrel idler pulleys;
- a mandrel drive belt driven by the pre-spin drive assembly, the mandrel drive belt configured to contact mandrels for imparting spin to the mandrels before the mandrels are positioned for contact with an applicator roller of the over-varnish unit; and
- an over-varnish unit enclosure that houses the applicator roller;
- wherein the pre-spin drive motor, the mandrel drive belt pulley, and the mandrel idler pulleys are outside of the over-varnish unit enclosure.

9. A method of applying pre-spin to a can mounted on a rotating mandrel of a can decorating machine includes the steps of:
- in the combination of claim 1, imparting rotation to the mandrel through contact with the mandrel drive belt before the can bodies contact the applicator roller of the over-varnish unit.

* * * * *